(12) United States Patent
Graham et al.

(10) Patent No.: US 9,311,127 B2
(45) Date of Patent: Apr. 12, 2016

(54) MANAGING CONFIGURATION AND SYSTEM OPERATIONS OF A SHARED VIRTUALIZED INPUT/OUTPUT ADAPTER AS VIRTUAL PERIPHERAL COMPONENT INTERCONNECT ROOT TO SINGLE FUNCTION HIERARCHIES

(75) Inventors: Charles S. Graham, Rochester, MN (US); Gregory M. Nordstrom, Pine Island, MN (US); John R. Oberly, III, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 431 days.

(21) Appl. No.: 13/328,595

(22) Filed: Dec. 16, 2011

(65) Prior Publication Data
US 2013/0160002 A1 Jun. 20, 2013

(51) Int. Cl.
*G06F 9/455* (2006.01)
(52) U.S. Cl.
CPC .. *G06F 9/45558* (2013.01); *G06F 2009/45579* (2013.01)
(58) Field of Classification Search
None
See application file for complete search history.

(56) References Cited

U.S. PATENT DOCUMENTS

| | | | |
|---|---|---|---|
| 6,035,346 A | 3/2000 | Chieng et al. | |
| 6,330,656 B1 * | 12/2001 | Bealkowski et al. | ........... 712/13 |
| 7,120,778 B2 | 10/2006 | Zimmer | |
| 7,743,189 B2 | 6/2010 | Brown et al. | |
| 7,873,068 B2 | 1/2011 | Klinglesmith et al. | |
| 7,934,033 B2 | 4/2011 | Malwankar et al. | |
| 7,979,592 B1 | 7/2011 | Pettey et al. | |
| 2003/0217168 A1 | 11/2003 | Adachi et al. | |
| 2004/0181625 A1 | 9/2004 | Armstrong et al. | |
| 2005/0223145 A1 | 10/2005 | Lin et al. | |
| 2006/0154725 A1 | 7/2006 | Glaser et al. | |
| 2006/0253619 A1 * | 11/2006 | Torudbakken et al. | ......... 710/31 |
| 2007/0011491 A1 | 1/2007 | Govindarajan et al. | |
| 2008/0147898 A1 | 6/2008 | Freimuth et al. | |
| 2008/0168461 A1 | 7/2008 | Arndt et al. | |
| 2008/0216085 A1 | 9/2008 | Arndt et al. | |
| 2008/0270735 A1 | 10/2008 | Arndt et al. | |
| 2009/0089464 A1 | 4/2009 | Lach et al. | |
| 2009/0144731 A1 | 6/2009 | Brown et al. | |
| 2009/0187694 A1 | 7/2009 | Baba et al. | |
| 2009/0249300 A1 | 10/2009 | Vainer et al. | |
| 2009/0249330 A1 | 10/2009 | Abercrombie et al. | |

(Continued)

FOREIGN PATENT DOCUMENTS

TW 200925878 6/2009

OTHER PUBLICATIONS

Intel, Inc.; "PCI-SIG Single Root I/O Virtualization (SRIOV) Support in Intel Virtualization Technology for Connectivity"; www.intel.dk/jp/software . . . ; 2008.

(Continued)

*Primary Examiner* — Ilwoo Park
(74) *Attorney, Agent, or Firm* — Toler Law Group, P.C.

(57) ABSTRACT

A computer implemented method of managing an adapter includes enabling an adapter to be shared by operating systems and logical partitions. The adapter includes a plurality of multiple virtual functions. A virtualization intermediary may assign a virtual function of the plurality of virtual functions to at least one of an operating system and a logical partition. The virtual function may be used to modify an operational status of the adapter.

20 Claims, 14 Drawing Sheets

(56) References Cited

U.S. PATENT DOCUMENTS

| | | | |
|---|---|---|---|
| 2009/0276551 | A1 | 11/2009 | Brown et al. |
| 2009/0276773 | A1* | 11/2009 | Brown et al. ............... 718/1 |
| 2009/0276775 | A1* | 11/2009 | Brown et al. ............ 718/100 |
| 2010/0153592 | A1 | 6/2010 | Freimuth et al. |
| 2010/0232443 | A1* | 9/2010 | Pandey .................. 370/401 |
| 2010/0251391 | A1 | 9/2010 | Adrangi |
| 2010/0290467 | A1 | 11/2010 | Eisenhauer et al. |
| 2011/0179413 | A1 | 7/2011 | Subramanian et al. |
| 2011/0202702 | A1 | 8/2011 | Fan et al. |
| 2012/0089864 | A1 | 4/2012 | Tanaka et al. |
| 2012/0096192 | A1 | 4/2012 | Tanaka et al. |
| 2012/0151472 | A1 | 6/2012 | Koch et al. |
| 2013/0111082 | A1* | 5/2013 | Baba et al. .................. 710/38 |
| 2013/0159572 | A1 | 6/2013 | Graham et al. |
| 2013/0159686 | A1 | 6/2013 | Graham et al. |
| 2013/0160001 | A1 | 6/2013 | Graham et al. |

OTHER PUBLICATIONS

Emulex; "Optimizing Virtualized Servers with SR-IOV"; whitepaper; www.emulex.com/artifacts/885edbe . . . ; 2010.

Red Hat, Inc.; "SR-IOV Performance Advantage: Red Hat Enterprise Linux 6 improved virtualized database performance over 23 percent," A Principled Technologies Test Report; www.principledtechnologies.com/RedHat; Nov. 2010.

Gaihong Lian et al.; "Research and implementation of heterogeneous data sharing"; IEEE Intern'l Conference on Computer Mechatronics, Control & EE(CMCE2010); 2010.

Ben-Ami Yassour et al.; "On the DMA Mapping Problem in Direct Device Assignment"; SYSTOR 2010 Proceedings of the 3rd Annual Haifa Experimental Systems Conf; May 2010.

Charles S. Graham et al., U.S. Appl. No. 13/328,535 entitled "Managing Configuration and System Operations of a Non-Shared Virtualized Input/Output Adapter as Virtual Peripheral Component Interconnect Root to Single Function Hierarchies," filed Dec. 16, 2011.

Charles S. Graham et al., U.S. Appl. No. 13/328,640 entitled "Managing Configuration and System Operations of a Non-Shared Virtualized Input/Output Adapter as Virtual Peripheral Component Interconnect Root to Multi-Function Hierarchies," filed Dec. 16, 2011.

Charles S. Graham et al., U.S. Appl. No. 13/328,671 entitled "Managing Configuration and Operation of an Adapter as a Virtual Peripheral Component Interconnect Root to Expansion Read-Only Memory Emulation," filed Dec. 16, 2011.

International Search Report and Written Opinion of the ISA dated Dec. 21, 2012—International Application No. PCT/US2012/059684.

International Search Report dated Dec. 7, 2012, International Application No. PCT/US2012/059418, 2 pages.

International Search Report dated Dec. 11, 2012, International Application No. PCT/US2012/059685, 2 pages.

International Search Report dated Dec. 11, 2012, International Application No. PCT/US2012/059686, 2 pages.

U.S. Appl. No. 13/328,535; Non-Final Office Action dated Mar. 24, 2014; 37 pages.

U.S. Appl. No. 13/328,640; Non-Final Office Action dated Jun. 3, 2014; 24 pages.

Lowe, S., "What is SR-IOV?" Dec. 2, 2009, accessed at blog.scottlowe.org/2009/12/02/what-is-sr-iov, 9 pages.

U.S. Appl. No. 13/328,535, Final Office Action dated Aug. 14, 2014, 27 pages.

U.S. Appl. No. 13/328,671; Non-Final Office Action dated Jul. 8, 2014; 19 pages.

U.S. Appl. No. 13/328,535; Non-Final Office Action dated Dec. 12, 2014; 16 pages.

U.S. Appl. No. 13/328,640; Final Office Action dated Dec. 18, 2014; 13 pages.

U.S. Appl. No. 13/328,671; Final Office Action dated Dec. 3, 2014; 9 pages.

\* cited by examiner

MANAGING CONFIGURATION AND SYSTEM OPERATIONS OF A SHARED VIRTUALIZED INPUT/OUTPUT ADAPTER AS VIRTUAL PERIPHERAL COMPONENT INTERCONNECT ROOT TO SINGLE FUNCTION HIERARCHIES

I. FIELD OF THE DISCLOSURE

The present disclosure relates generally to computer systems, and more particularly, to managing virtual functions that are hosted by a virtualized input/output (I/O) adapter.

II. BACKGROUND

Single Root I/O Virtualization (SR-IOV) is a specification that allows a Peripheral Component Interconnect Express (PCIe) device to appear to be multiple separate physical PCIe devices. SR-IOV enables a virtualization intermediary (VI), such as a hypervisor or virtual input/output (I/O) server operating system, to configure an I/O adapter into a number of virtual functions (VFs). The virtual functions may be assigned to different operating system images (OSIs), or logical partitions (LPARs).

The virtual functions belong to a PCI hierarchy and are of a device type that may be undefined in operating system and system firmware. Configuration of the virtual functions may require significant administrator man-hours and system downtime. Association and management of the virtual functions with a PCI adapter or adapter slot location that is subject to PCI adapter maintenance and administrative operations, such as adapter hot plug and dynamic assignment to or from logical partitions, may be undefined in operating systems and system firmware.

III. SUMMARY

In a particular embodiment, a computer implemented method of managing an adapter includes enabling an adapter to be shared by operating systems and logical partitions. The adapter includes a plurality of multiple virtual functions. A virtualization intermediary may assign a virtual function of the plurality of virtual functions to at least one of an operating system and a logical partition. The virtual function is used to modify an operational status of the adapter.

In another particular embodiment, an apparatus includes an adapter slot and an adapter to position within the adapter slot. The adapter includes a plurality of virtual functions. The apparatus further includes a processor and a memory storing program code. The program code is executable by the processor to enable the adapter to be shared by at least one of a plurality of operating systems and a plurality of logical partitions. A virtual function of the plurality of virtual functions may be assigned to at least one of an operating system of the plurality of operating systems and a logical partition of the plurality of logical partitions, and the virtual function may be used to modify an operational status of the adapter.

In another particular embodiment, a computer program product includes a computer usable medium having computer usable program code embodied therewith. The computer usable program code may be executable by a processor to enable an adapter to be shared by at least one of a plurality of operating systems and a plurality of logical partitions, where the adapter includes a plurality of virtual functions. A virtual function of the plurality of virtual functions may be assigned to at least one of an operating system of the plurality of operating systems and a logical partition of the plurality of logical partitions. The virtual function may be used to modify an operational status of the adapter.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
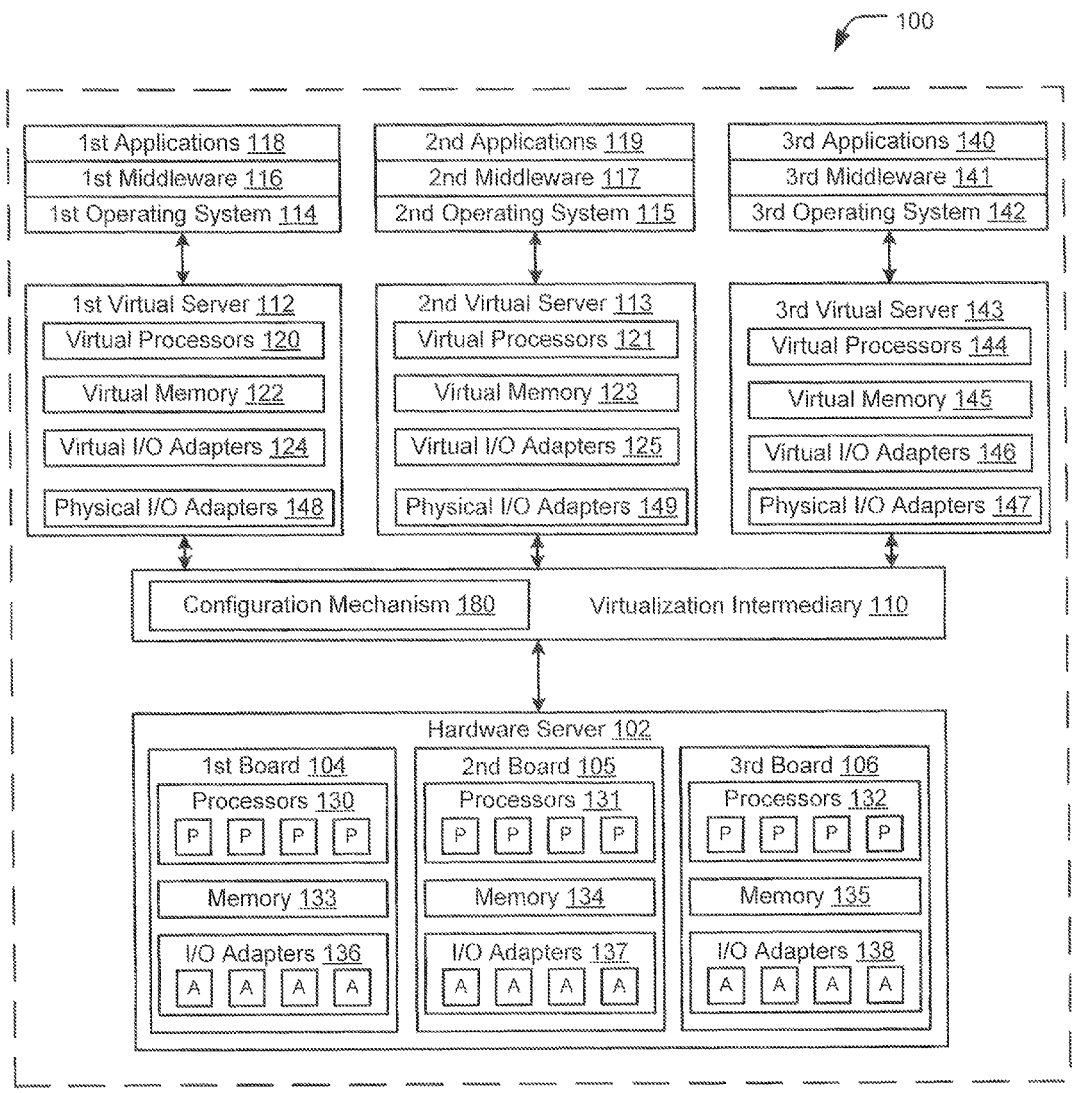
FIG. 1 is a block diagram of a first embodiment of a system to manage a configuration space of an I/O adapter.

In a virtualized computer system, a hardware input/output (I/O) adapter may be capable of providing virtual functions to multiple logical partitions. For example, the hardware I/O adapter may be a single root input/output virtualized (SR-IOV) adapter or a multiple root input/output virtualized (MR-IOV) adapter. A virtualization intermediary (VI), such as a hypervisor, a hosting operating system, or other firmware or software entity within a virtualized computer system acting as a virtualization management agent, may manage the execution of the multiple logical partitions and assign one or more of the virtual functions to particular logical partitions to enable the logical partitions to perform I/O operations.

Each virtual function may have an associated configuration space that is located at a memory of the hardware I/O adapter. The configuration space may include a read-only portion and a read-write portion. For example, the read-only portion may provide information associated with the virtual function, such as a device identifier and a vendor identifier, and information associated with the hardware I/O adapter, such as a number of ports of the hardware I/O adapter and an arrangement of the ports. The read-write portion may include parameters that can be configured (e.g., by a logical partition or by an application executing in the logical partition), such as enabling/disabling memory-mapped I/O (MMIO), enabling/disabling direct memory access (DMA), setting a maximum link speed, enabling/disabling advanced error handling, setting another virtual function parameter or any combination thereof. In a particular embodiment, the configuration space may include one or more registers, such as read-only registers and read-write registers.

The virtualization intermediary may provide an access mechanism to enable a logical partition to access the configuration space that is associated with the virtual function that is assigned to the logical partition. The access mechanism provided by the virtualization intermediary may be a high-level access mechanism that uses lower-level access mechanisms to access the configuration space of each virtual function. For example, the access mechanism provided by the virtualization intermediary may call a configuration space access mechanism of a root complex, an adapter provided configuration mechanism, another access mechanism, or any combination thereof.

A particular embodiment facilitates the implementation and application of Peripheral Component Interconnect Express (PCIe) Single Root I/O Virtualization (SR-IOV) adapter by presenting the SR-IOV adapter and associated virtual functions to system components in a manner that avoids change to the system components. Illustrative such system components may be outside of the virtualization intermediary, such as system or platform management systems, operating systems, system firmware, and I/O device drivers. The virtualization intermediary may detect and initialize physical functions and virtual functions correctly and appropriately.

An embodiment enables a virtualization intermediary to present and operate SR-IOV adapters and virtual functions within system management, operating system, and system firmware components in a manner that substantially conforms to that of non-SR-IOV PCI adapters. SR-IOV technology may be adapted to operating systems and firmware that already support PCI-e adapters in an automatic and inexpensive manner.

An SR-IOV adapter may be virtualized to be shared by multiple OSIs/LPARs within a logically partitioned environment, or may be assigned to one OSI/LPAR as a dedicated adapter. In the shared case, a virtualization intermediary may configure the adapter in SR-IOV-enabled mode and make individual virtual functions available for assignment to an individual operating system or logical partition. In the shared model, the operating system may have no direct awareness of the SR-IOV adapter. Instead, the operating system may see only virtual functions on the SR-IOV adapter to which the virtualization intermediary has assigned to the SR-IOV adapter.

In the case of a dedicated (e.g., non-shared) operating system, the operating system may desire to use the adapter in legacy mode. In legacy mode, the SR-IOV capabilities may not be enabled or used. Another legacy mode scenario may include an adapter enabled for SR-IOV and an operating system that implements a single device driver for the virtual function (or for each virtual function of a plurality of multiple functions). The device driver arrangement may avoid development of a more complex device driver that encompasses both virtual function and adapter physical and management functions.

Where a platform management administers logical partitions and shares SR-IOV adapters as individual virtual functions, an SR-IOV-enabled adapter may be dedicated to a single operating system or logical partition by assigning all of the adapter virtual functions to the operating system or logical partition. This dedicated assignment may allow the operating system or logical partition to provide a virtual function device driver and may delegate the larger adapter configuration and management or service functions to the platform management and virtualization intermediary.

A computing system that is not under such a partition management agent (i.e., a non-managed system) may inherit ownership of all of the PCI devices. The operating system and system firmware may perform all adapter configuration and management operations. The operating system may provide device driver resources to manage the adapter, whether virtualized or not. Further, an operating system may desire to use a non-shared adapter in a legacy mode, i.e., without SR-IOV being enabled. Other operating system instances running on the same logically partitioned system may desire to use the adapter in a non-shared, virtualized mode (e.g., SR-IOV-enabled) when ownership of the adapter is transferred to the operating system or logical partition. An embodiment may enable an SR-IOV adapter to be assigned to, or on a non-managed system to default to be owned by, an operating system or logical partition as wholly owned by that operating system or logical partition in either a virtualized or non-virtualized mode. According to an embodiment, the virtualization intermediary automatically and selectively translates between an SR-IOV function to an emulated PCI-standard function to enable control by the operating system.

Referring to FIG. 1, a block diagram of a first embodiment of a system having functions hosted by an input/output adapter is depicted and generally designated 100. The system may use a virtualization intermediary 110 to selectively and automatically correlate SR-IOV virtual functions to non-SR-IOV functions, such as PCI-standard functions.

More particularly, the system 100 may include a hardware server 102 that is managed by the virtualization intermediary 110, such as a hypervisor. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by the virtualization intermediary 110. Each processor of the processors 130-132 may be a simultaneous multithreading (SMT)-capable processor that is capable of concurrently executing multiple different threads.

The virtualization intermediary 110 may create and manage logical partitions, such as virtual servers 112, 113, 143. A logical partition may be a subset of the resources of the hardware server 102 that is virtualized as a separate virtual server. Each of the virtual servers 112, 113, 143 may have its own set of virtual resources, similar to a physical server. For example, the first virtual server 112 may include virtual processors 120, virtual memory 122, and virtual I/O adapters 124. The second virtual server 113 may include virtual processors 121, virtual memory 123, and virtual I/O adapters 125. The second virtual server 143 may include virtual processors 143, virtual memory 145, and virtual I/O adapters 146. The virtualization intermediary 110 may map the hardware of the hardware server 102 to the virtual servers 112, 113, 143. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. Each of the virtual servers 112, 113, 143 may include a physical I/O adapter 147-149. The physical I/O adapters 147-149 may correspond to I/O adapters 136-138. The virtualization intermediary 110 may manage the selection of portions of the hardware server 102 and their temporary assignment to portions of the virtual servers 112, 113, including assignment of one or a plurality of physical adapters 136-138 to one virtual server.

The virtualization intermediary 110 may provide a configuration mechanism 180 to configure and manage a PCI hierarchy that includes a PCI host bridge and virtual functions. SR-IOV virtual functions may be presented to an operating system 114, 115 as non-IOV functions of a PCI multifunction device. According to another embodiment, the configuration mechanism 180 may not configure the adapters 136-138 in SR-IOV mode, and may instead allow the operating system 114, 115 to operate the adapters 136-138 as legacy PCI adapters.

Figure 2:
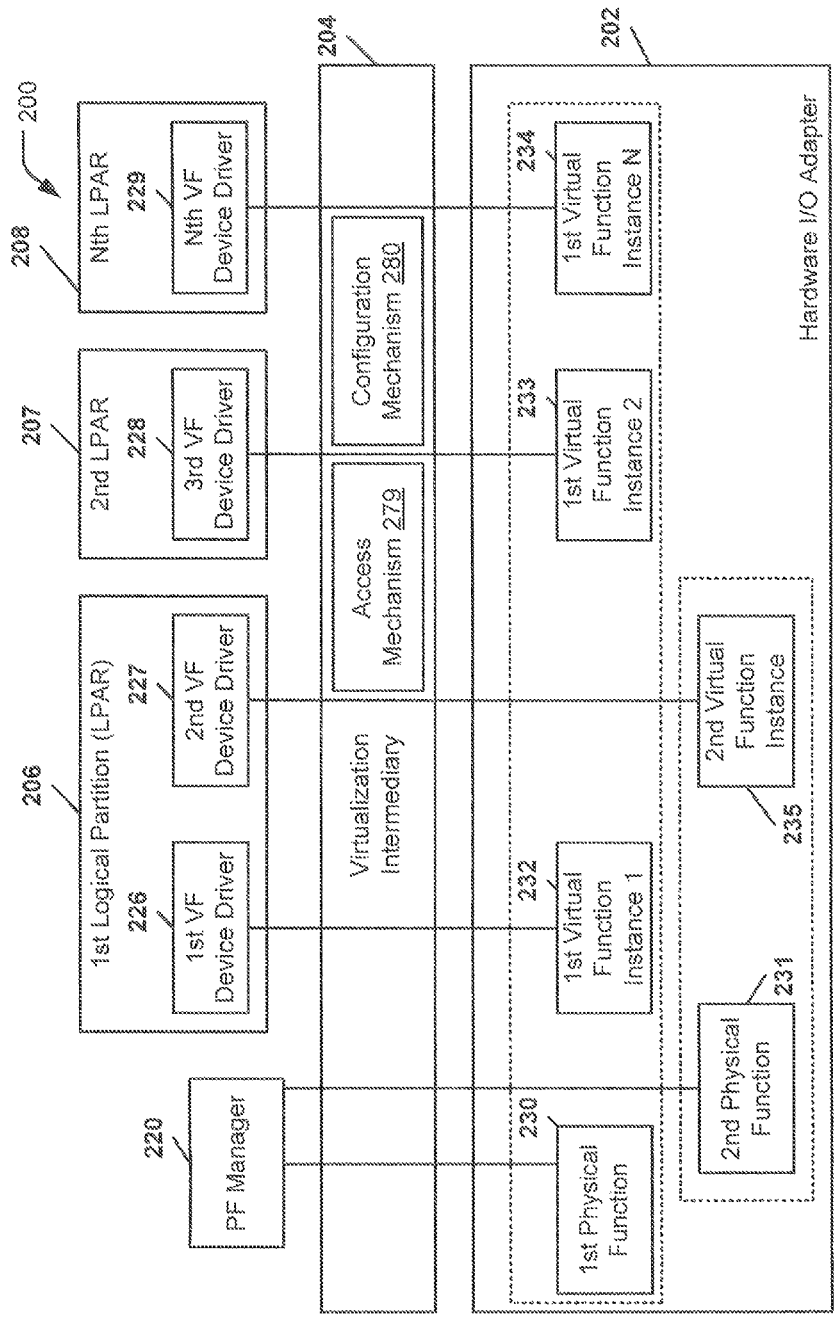
FIG. 2 is a block diagram of a second embodiment of a system to manage a configuration space of an I/O adapter.

Referring to FIG. 2, a block diagram of a second embodiment of a system to manage functions hosted on an I/O adapter is depicted and generally designated 200. In the system 200, a hypervisor, or other virtualization intermediary 204, may enable multiple logical partitions to access virtual functions provided by hardware that includes a hardware I/O adapter 202. For example, the virtualization intermediary 204 may enable a first logical partition 206, a second logical partition 207, and an Nth logical partition 208, to access virtual functions 232-235 that are provided by the hardware I/O adapter 202. To illustrate, the virtualization intermediary 204 may use a first physical function 230 of the hardware I/O adapter 202 to provide a first instance of a first virtual function 232, a second instance of a first virtual function 233, and an Nth instance of a first virtual function 234 to the logical partitions 206-208. The virtualization intermediary 204 may use a second physical function 231 of the hardware I/O adapter 202 to provide a second virtual function 235 to the logical partitions 206-208.

The physical functions 230, 231 may include PCI functions that support single root I/O virtualization capabilities. Each of the virtual functions 232-235 may be associated with one of the physical functions 230, 231 and may share one or more physical resources of the hardware I/O adapter 202.

Software modules, such as a physical function (PF) manager 220, may assist the virtualization intermediary in managing the physical functions 230, 231 and the virtual functions 232-235. For example, a user may specify a particular configuration and the PF manager 220 may configure the virtual functions 232-235 from the physical functions 230, 231 accordingly.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232. The second client virtual I/O 227 may access the second virtual function 235. A third client virtual I/O 228 executing at the second logical partition 207 may access the second instance of the first virtual function 233. An Nth client virtual I/O 229 executing at the Nth logical partition 208 may access the Nth instance of the first virtual function 233.

The virtualization intermediary 204 may assign the first instance of the first virtual function 232 and the first instance of the second virtual function 235 to the first logical partition 206. The virtualization intermediary 204 may provide the first logical partition 206 with two tokens (not shown), such as a first token and a second token, to enable the first logical partition 206 to access the virtual functions 232 and 235. The token may include a group identifier that identifies a physical adapter slot location of the hardware I/O adapter 202 that hosts the virtual functions 232 and 235. The hardware I/O adapter 202 that hosts the virtual functions 232 and 235 may be moved from a first physical adapter slot location to a second physical adapter slot location. After the move, the virtualization intermediary 202 may associate the group identifier with the second physical adapter slot location to enable the virtual functions 232 and 235 to be provided to the first logical partition 206.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function. The virtualization intermediary 204 may provide a configuration mechanism 280 to selectively and automatically associate SR-IOV virtual functions with non-SR-IOV functions, such as PCI-standard functions virtual functions.

Figure 3:
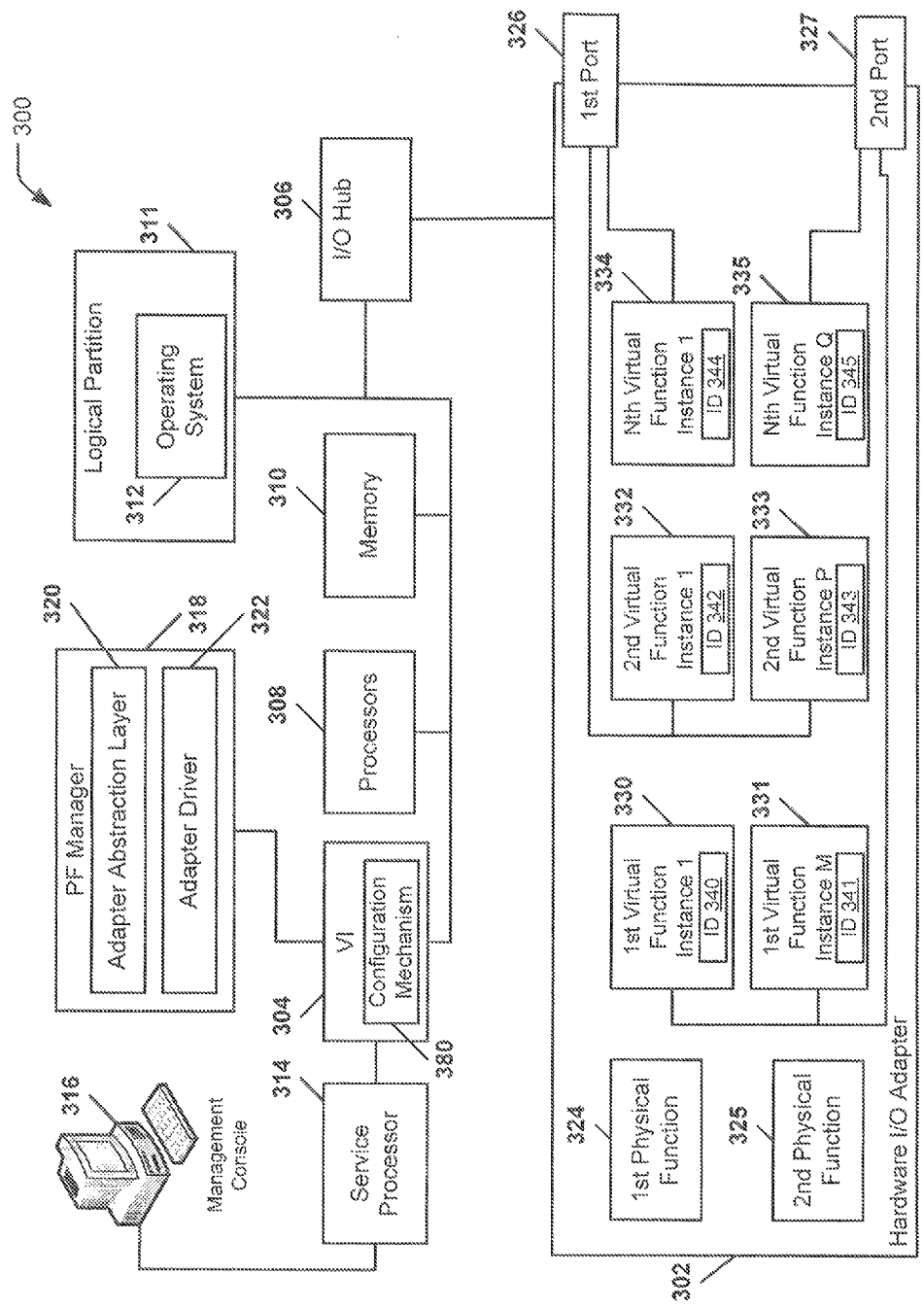
FIG. 3 is a block diagram of a third embodiment of a system to manage a configuration space of an I/O adapter.

Referring to FIG. 3, a block diagram of a third embodiment of a system to emulate SR-IOV functions to an operating system as non-SR-IOV functions is depicted and generally designated 300. In the system 300, a virtualization intermediary (VI) 304 may be coupled to hardware devices, such as a hardware I/O adapter 302, an I/O hub 306, processors 308, and a memory 310. The virtualization intermediary 304 may be coupled to a logical partition 311 that executes an operating system 312. The virtualization intermediary 304 may enable the logical partition 311 to access virtual functions associated with the hardware I/O adapter 302. A physical function (PF) manager 318 may be coupled to the virtualization intermediary 304 to manage the physical functions of the hardware I/O adapter 302. In a particular embodiment, the PF manager 318 may be in a logical partition. A management console 316 may be coupled to the virtualization intermediary 304 via a service processor 314.

The service processor 314 may be a microcontroller that is embedded in a hardware server (e.g., the hardware server 102 of FIG. 1) to enable remote monitoring and management of the hardware server via a management console 316. For example, the management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the management console 316.

The virtualization intermediary 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The virtualization intermediary 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the virtualization intermediary 304. The I/O hub 306 may enable the virtualization intermediary 304 to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The virtualization intermediary 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

Each virtual function (e.g., each of the virtual functions 330-335) may have an associated virtual function identifier (ID). For example, in the system 300, the first instance of the first virtual function 330 may have an associated identifier 340, the Mth instance of the first virtual function 331 may have an associated identifier 341, the first instance of the second virtual function 332 may have an associated identifier 342, the Pth instance of the second virtual function 333 may have an associated identifier 343, the first instance of the Nth virtual function 334 may have an associated identifier 344, and the Qth instance of the Nth virtual function 335 may have an associated identifier 345.

Each virtual function identifier may uniquely identify a particular virtual function that is hosted by the hardware I/O adapter 302. For example, when a message (not shown) is routed to a particular virtual function, the message may include the identifier associated with the particular virtual function. As another example, a token 313 may be provided to the operating system 312 to enable the operating system 312 to access one of the virtual functions 330-335 at the hardware I/O adapter 302. The token 313 may include a configuration mechanism 380 that is associated with the accessed virtual function. For example, the first instance of the first virtual function 330 may be assigned to the operating system 312. The token 313 may be provided to the operating system 312 to access the first instance of the first virtual function 330. The token 313 may include the virtual function identifier 380. The virtual function identifier 380 may comprise the identifier 340 that is associated with the first instance of the first virtual function 330.

The virtualization intermediary 304 may assign one or more of the virtual functions 330-335 to the logical partition 311. For each virtual function that is assigned to the logical partition 311, the virtualization intermediary 304 may provide the logical partition 206 with a token (not shown) to enable the logical partition 311 to access the virtual function. The token may include a group identifier that identifies a physical adapter slot location of the hardware I/O adapter 302 that hosts the assigned virtual functions.

The virtualization intermediary 304 may provide an access mechanism 380 to enable logical partitions (e.g., the logical partition 311) to access configuration space associated with one or more of the virtual functions 330-335. The virtualization intermediary 304 may include an access mechanism 279 to enable logical partitions to access the PCI memory space, PCI DMA space, and interrupt ranges associate with virtual functions. In a legacy or SR-IOV model, the operating system device driver may access to the PCI memory that maps BARs, as well as access to a DMA window that the virtual function can use to DMA to memory, and a range of PCI interrupts the device driver can use to enable the virtual function to signal interrupts. This feature may provide for virtual functions in the same or a similar manner to that of legacy mode adapter function.

Figure 4:
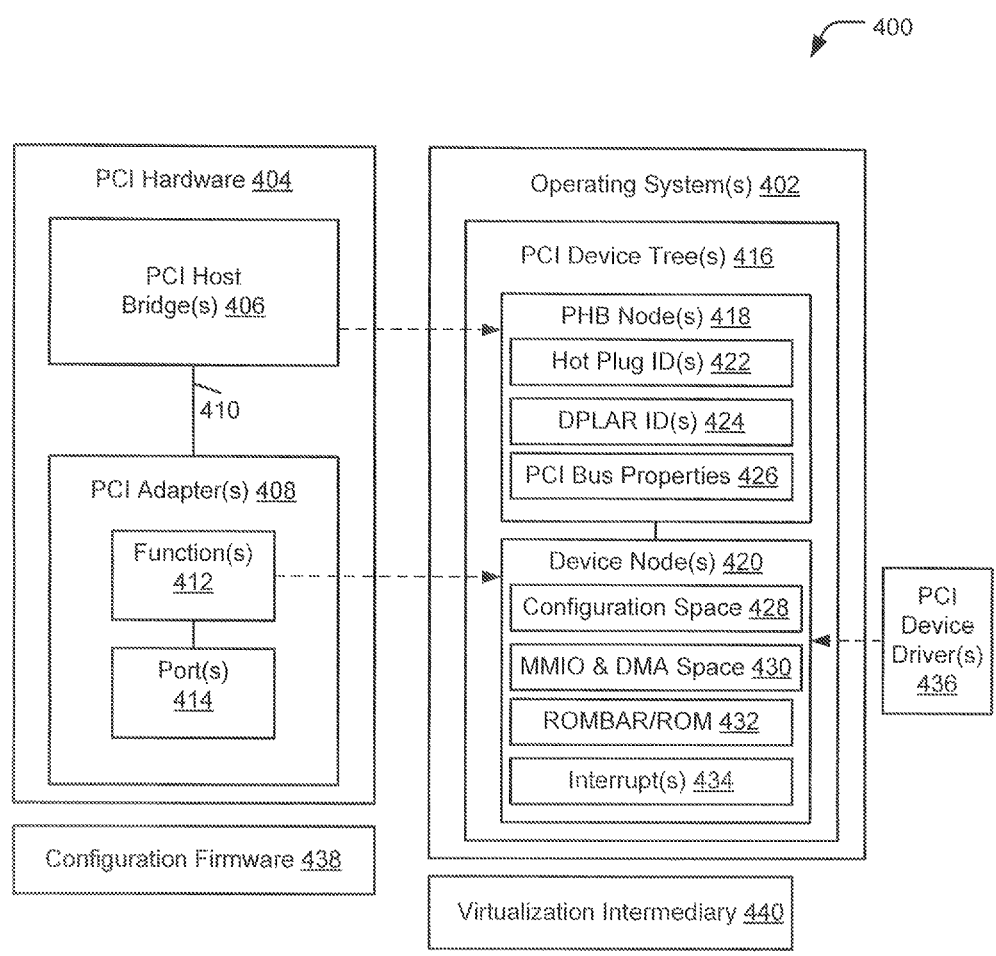
FIG. 4 is a block diagram of an embodiment of a system having an operating system that manages elements of a shared legacy PCI adapter.

FIG. 4 shows a block diagram of an embodiment of a logically partitioned computing system 400 having an operating system 402 configured to manage elements of PCI hardware 404, including a PCI adapter 408. The PCI adapter 408 may be shared, e.g., owned by multiple operating systems 402. The PCI Adapter 408 may be a legacy adapter. The computing system 400 may further include PCI configuration firmware 438 and a virtualization intermediary (VI) 440, such as a hypervisor.

The PCI hardware 404 may include a PCI host bridge (PHB) 406, associated with a PCI-express root port (not shown). The PCI host bridge 406 may be coupled to the PCI adapter 408 via a PCI bus 410 representing a PCIe physical link connection (not shown) between the PCIe root port and a PCI adapter 408. The PCI adapter 408 may include a function 412 and a port 414.

The operating system 402 may include a PCI device tree 416 and a PCI device driver 436. The PCI device tree 416 may include a PCI host bridge node 418 and a device node 420. The PCI host bridge node 418 may include a hot plug identifier (ID) 422, a dynamic logical partitioning (DLPAR) ID 424, and PCI bus properties 426. The device node 420 may include a configuration space 428, memory-mapped I/O (MIMIO) and direct memory access (DMA) space 430, a PCI read only memory base address register/read-only memory (ROMBAR/ROM) space 432, and an interrupt 434.

The PCI host bridge 406 may create an instance of the PCIe bus 410 connected to the PCI adapter 408. The function(s) 412 may be individually addressable in PCI configuration address space. For example, the function(s) 412 may have the same PCI device number and differing PCI function numbers (e.g., ranging from 0 to 7). Alternatively, the PCI adapter 408 may use PCI alternate routing ID (ARI) configuration addressing. Each function 412 may have a unique configuration function number ranging from 0 to 255 at an implied device number of 0. Each function 412 may be associated with a unique physical port 414 within the PCI adapter 408. The physical port 414 may create a connection to an external peripheral I/O interconnect, such as Ethernet, Fiber Channel, or another peripheral device interconnect.

The function(s) 412 may form a device driver programming interface by which the operating system 402 may utilize the PCI device driver 436. The PCI host bridge node(s) 418 may represent the PCI host bridge(s) 406, and the PCI device node(s) 420 may represent each instance of the function(s) within the PCI adapter 408.

The PCI host bridge node 418 may include properties, or functions, descriptive of the PCI host bridge 406. Such properties may include characteristics of the PCIe bus 410 created by that PCI host bridge 406. The characteristics may be used by the operating system 402 to manage the PCI host bridge 406 and by the PCI device driver 436 to perform PCI bus transactions. For example, the PCI host bridge node properties may include an identifier used for a hot plug domain 422 and an identifier for a DLPAR domain 424.

The operating system 402 may utilize the configuration firmware 438 to detect the presence of PCI devices, such as the function(s) 412. For each detected function 412, the configuration firmware 438 may generate a device node 420 associated with the PCI host bridge node 418 of the PCI device tree 416. The device node 420 may include functions, or properties, associated uniquely with the function 412 and used by the operating system 402 to identify the type and programming interface of the function 412. Illustrative such functions may relate to the configuration space 428 and the ROMBAR/ROM space 432. The properties may further be used by the device driver 436 to perform PCI bus transactions specific to that function 412, as well as to properties relating to the MIMIO and DMA space 430, the ROMBAR/ROM space 432, and the interrupts 434.

For each device node 420 within the PCI device tree 416, the operating system 402 may activate an instance of the device driver 436 to control the characteristics of the associated function 412. Data transfer operations may be performed between the operating system 402, the external interconnect, and devices accessed through the corresponding physical port 414.

The hot plug ID 422 of the PCI host bridge node 418 may be used to identify the PCI bus 410 physical connection point, or adapter slot. The adapter slot may be located between the PCI host bridge 406 and the PCI adapter 408. The operating system 402 may use the hot plug ID 422 when adapter a power-off or power-on operation is performed. The operating system 402 may be running and may be in control of the PCI host bridge 406 and the PCI bus 410.

To power-off the adapter 105, the operating system 402 may correlate a hot plug ID of a hot plug power-off/on operation with the hot plug ID 422 of the PCI host bridge node 418. As part of performing the power-off operation, the operating system 402 may first deactivate the device driver(s) 436. As discussed herein, the device driver(s) 436 may be associated with each device node 420, and each device node 420 may be associated with the PCI host bridge node 418.

When powering-on the PCI adapter 105, the configuration firmware 438 associated with the operating system 402 may interrogate each possible PCI configuration address of the PCI bus 410 to detect each function 412. The configuration firmware 438 may construct a device node 420 that is associated with the PCI host bridge node 418. The operating system 402 may create instances of the device driver(s) 436 that are associated with each device node 420. The device driver(s) 436 may control each of the associated functions 412.

The PCI host bridge(s) 406 may be connected individually to PCI adapter slots. An adapter slot may be a connection point at which the PCI adapters 408 may be added at a future time. The configuration firmware 438 may generate the PCI host bridge node(s) 418 of the PCI device tree 416 for each PCI host bridge 406. This generation may occur at an instance where the PCI host bridge 406 is connected to a PCI adapter slot that is empty (e.g., does not have a PCI adapter 408 present).

The PCI adapter 408 may be transferable to different logical partitions using DLPAR. The PCI host bridge node 418 of the PCI device tree 416 may represent the domain of the functions 412 that are transferred, collectively, between logical partitions of the operating system 402. The virtualization intermediary 440 may act as a management agent of a system administrator to automatically associate elements of the PCI hardware 404 with an operating system(s) 402 comprising logical partitions.

The virtualization intermediary 440 may function as a system administrator for DLPAR by removing the PCI adapter 408 from the operating system 402. More specifically, the virtualization intermediary 440 may signal to the operating system 402 to initiate removal of a particular PCI adapter 408 having a DLPAR ID that references a matching DLPAR ID 424 of the operating system 402. As part of removing the PCI adapter 408 from the operating system PCI configuration, the operating system 402 may deactivate the PCI device driver(s) 436 associated with each device node 420 that is associated with that PCI host bridge node 418. The operating system 402 may release control of the PCI host bridge 406 and the PCI adapter 408 to the virtualization intermediary 440.

When adding a PCI adapter 408 to the PCI configuration of an executing operating system 402, the virtualization intermediary 440 may signal the operating system 402 to add the PCI host bridge node 418 to the PCI device tree 416. The virtual PCI host bridge node 418 may correspond to the physical PCI host bridge 406 and to the associated PCIe bus 410. The operating system 402 may invoke the configuration firmware 438 to detect the functions 412 of the PCI adapter 408. The configuration firmware 438 may update the PCI device tree 416 with a device node 420 corresponding to each detected function 412 that is associated with the PCI host bridge node 418 and/or PCIe bus 410. The operating system 402 may create an instance of the PCI device driver 436. The PCI device driver 436 may be associated with each device node 420 in order to control each of the associated functions 412.

Figure 5:
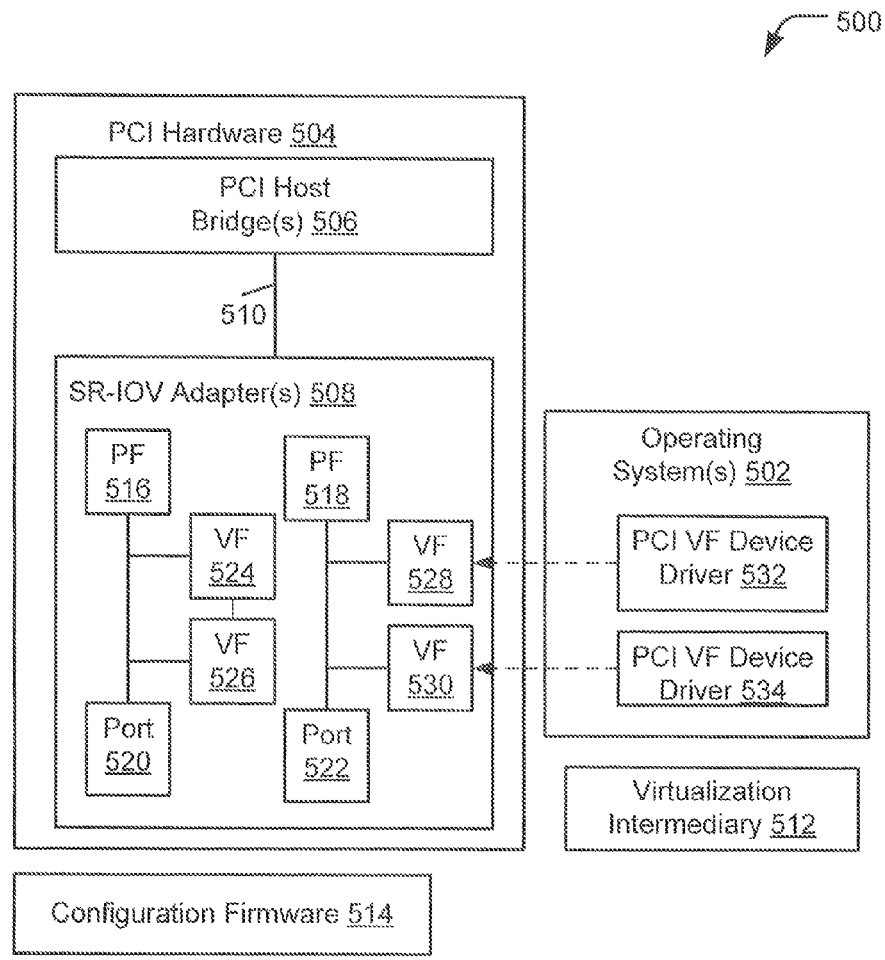
FIG. 5 is a block diagram of an embodiment of a system having an operating system that manages elements of a shared SR-IOV adapter.

FIG. 5 shows a block diagram of an embodiment of a logically partitioned computing system 500 having an operating system 502 configured to manage elements of PCI hardware 504, including an SR-IOV adapter virtual function 528. The computing system 500 may further include a virtualization intermediary 512 and configuration firmware 514. In one sense, FIG. 5 illustrates the PCI hierarchy for the SR-IOV adapter 508. According to an embodiment, the virtualization intermediary 512 automatically and selectively maps an SR-IOV function to an emulated PCI-standard function to enable control by the operating system 502.

The PCI hardware 504 may include a PCI host bridge (PHB) 506, associated with a PCIe root port (not shown). The PCI host bridge 506 may be coupled to the SR-IOV adapter 508 via a PCI bus 510, representing a PCIe physical link connection (not shown) between the PCI-express root port and the SR-IOV adapter 508. The SR-IOV adapter 508 may include physical functions (PFs) 516, 518 respectively coupled to ports 520 and 522. The SR-IOV adapter 508 may further include virtual functions (VFs) 524, 526 associated with the physical function 516, and virtual functions 528, 530 associated with the physical function 518. The operating system 502 may include multiple PCI virtual function device drivers 532, 534.

The SR-IOV adapter 508 may present one or more of the physical functions 516, 518 at the PCI bus device 510 across a PCI link. The physical functions 516, 518 may respond to configuration read and write cycles (e.g., at physical functions 516, 518 numbering 0 through 7). Alternatively, the SR-IOV adapter 508 may be designed according to PCI alternate routing ID (ARI) configuration addressing. Each physical function 516, 518 may have a unique configuration function number (e.g., ranging from 0 to 255 at an implied device number of 0). The ports 520, 522 may create a connection to an external peripheral I/O interconnect, such as Ethernet, Fiber Channel, or other peripheral device interconnects.

Each physical function 516, 518 may be further configured by the virtualization intermediary 512 into one or more of the virtual functions 524, 526, 528, 530. An embodiment of the virtualization intermediary 512 may include program code residing within firmware of the computer system 500. An embodiment of the virtualization intermediary 512 may include a hypervisor. The hypervisor may be a component of the computer system firmware or a type of operating system, or program within an operating system, that is a host to the operating systems 502. Another embodiment of the hypervisor may be a PCI manager program within the computer system having access to the SR-IOV adapter 508 by some physical interconnect that may be a PCI link or other physical connection. The PCI manager of an embodiment may be located locally or remotely, e.g., in a separate processor or memory.

Each virtual function 524, 526, 528, 530 may provide a PCI device programming interface that may be controlled by a PCI virtual function device driver 532, 534. The PCI virtual function device drivers 532, 534 may control the virtual functions 524, 526, 528, 530 to perform I/O transactions through the ports 520, 522 on behalf of the operating system 502.

As discussed herein, the virtual functions 524, 526, 528, 530 may be created under physical functions 516, 518, which may be associated with the ports 520, 522. The virtual functions 524, 526, 528, 530 may thus share the physical facilities of the ports 520, 522. The virtual functions 524, 526, 528, 530 may have a limited ability to perform I/O transactions through the ports 520, 522 and may affect the physical states of the ports 520, 522. The virtual functions 524, 526, 528, 530 may reconfigure the number and capabilities of the individual physical function 516, 518 within the SR-IOV adapter 508.

Figure 6:
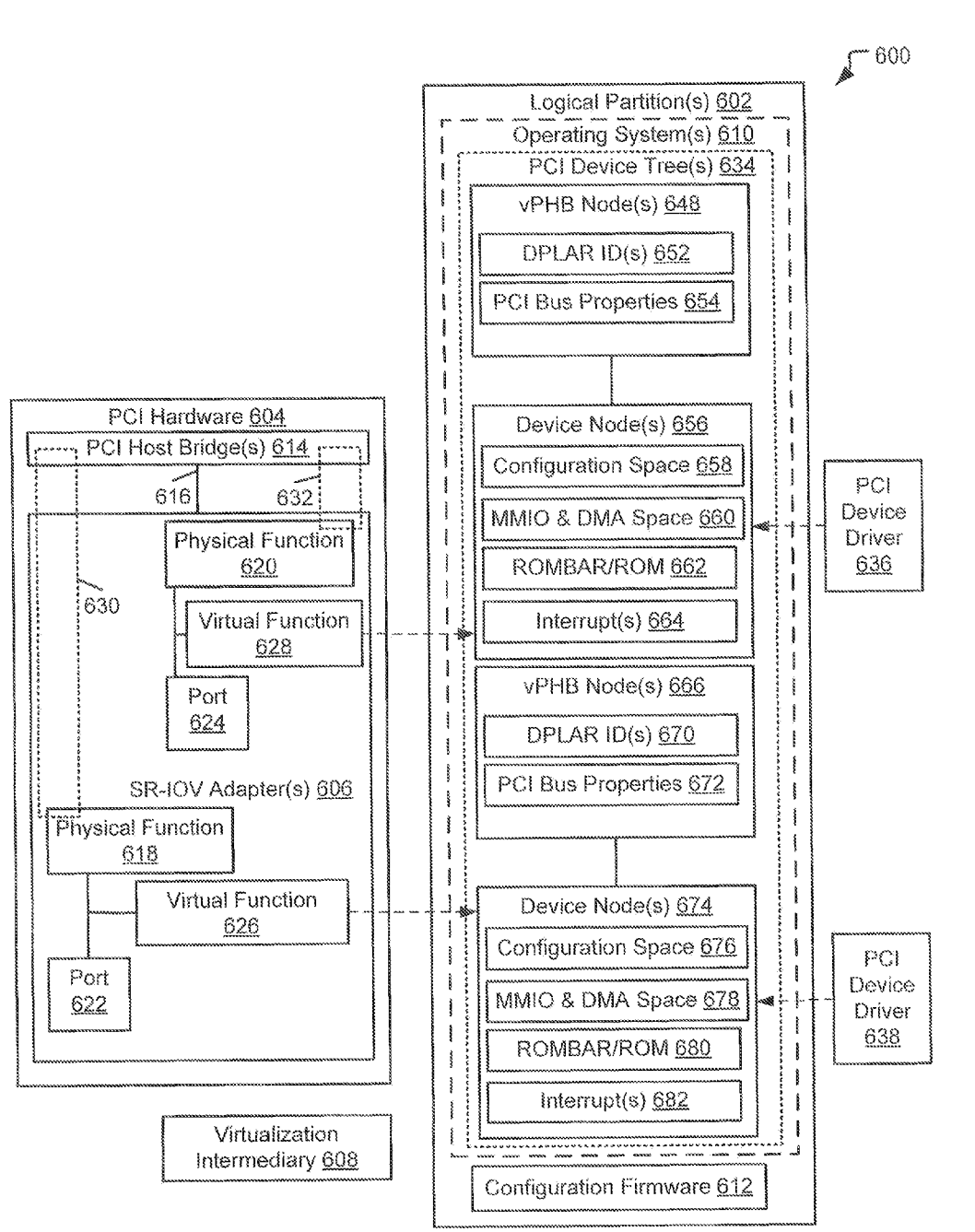
FIG. 6 is a flow diagram of an embodiment of a system having an operating system that manages elements of a shared adapter by mapping an SR-IOV function to an emulated PCI-standard function to enable.

FIG. 6 shows a block diagram of an embodiment of a logically partitioned computing system 600 having an logical partition 602 configured to manage elements of computer system hardware 604, including an SR-IOV adapter 606. The SR-IOV adapter 606 may be shared, in that it is assigned to multiple logical partitions 602. An illustrative logical partition 602 may include an operating system 610 and configuration firmware 612. The computing system 600 may include a virtualization intermediary 608 configured to automatically map an SR-IOV function to an emulated PCI-standard function to enable control by the logical partition 602 and/or the operating system 610.

The computer system hardware 604 may include a PCI host bridge (PHB) 614 coupled to the SR-IOV adapter 606 via a PCIe link 616. A PCIe bus (not shown) may be logically superimposed on the PCIe link 616 to facilitate PCI bus transactions between the PCI host bridge 614 and the SR-IOV adapter 606.

The SR-IOV adapter 606 may include physical functions (PFs) 618, 620 that are respectively coupled to ports 622 and 624. The SR-IOV adapter 606 may further include a virtual function (VF) 626 associated with the physical function 618, and a virtual function 628 associated with the physical function 620. As shown in FIG. 6 in broken lines, blocks 630 and 632 represent virtual PCI host bridge domains.

The operating system 610 may include a PCI device tree 634 and multiple PCI virtual function device drivers 636, 638. The PCI device tree 634 may include virtual PCI host bridge nodes 648 and 666.

A virtual PCI host bridge node 648 of the PCI device tree 634 may be associated with the virtual PCI host bridge domain 632. The virtual PCI host bridge node 648 may include a DLPAR ID 652 and PCI bus properties 654, derived from the properties of the physical PCI Host Bridge 614 and PCI bus link 616 and its associated PCI bus (not shown). The virtual PCI host bridge node 648 may be associated with a device node 656. The device node 656 may also be associated with the virtual function 628 and the PCI virtual function device driver 636. The device node 656 may include a configuration space 658, MMIO and DMA space 660, PCI ROMBAR/ROM space 662, and interrupts 664 that are an exclusive subset of the MMIO, DMA, and ROMBAR spaces and interrupts provided by the physical PCI Host Bridge 614.

A virtual PCI host bridge node 666 of the PCI device tree 634 may be associated with the virtual PCI host bridge domain 630. The virtual PCI host bridge node 666 may include a DLPAR ID 670, and PCI bus properties 672, derived from the properties of the physical PCI Host Bridge 614 and PCI bus link 616 and its associated PCI bus (not shown). The virtual PCI host bridge node 666 may be associated with a device node 674. The device node 674 may also be associated with the virtual function 626 and the PCI virtual function device driver 638. The device node 674 may include a configuration space 676, MMIO and DMA space 678, PCI ROMBAR/ROM space 680, and interrupts 682 that are an exclusive subset of the MMIO, DMA, and ROMBAR spaces and interrupts provided by the physical PCI Host Bridge 614.

The SR-IOV adapter 606 may present one or a plurality of the physical functions 618, 620 at the PCIe link 616 across a PCIe bus. The physical functions 618, 620 may respond to configuration read and write cycles. Alternatively, the SR-IOV adapter 606 may be designed according to PCI ARI configuration addressing. Each physical function 618, 620 may have a unique configuration function number. The ports 622, 624 may create a connection to an external peripheral I/O interconnect, such as Ethernet, Fiber Channel, or other peripheral device interconnects.

Each physical function 618, 620 may be further configured by the virtualization intermediary 608 into one or more of the virtual functions 626, 628. An embodiment of the virtualization intermediary 608 may include a program code within firmware of the computer system 600. Another embodiment of the virtualization intermediary 608 may be a hypervisor. The virtualization intermediary 608 may be a component of the computer system firmware or a type of operating system that is a host to the operating systems 610. Another embodiment of the virtualization intermediary 608 may be a PCI manager.

Each virtual function 626, 628 may provide a PCI device programming interface that may be controlled by PCI virtual function device drivers 636, 638. The PCI virtual function device drivers 636, 638 may control the virtual functions 626, 628 to perform I/O transactions through the ports 622, 624 on behalf of the operating system 610.

As discussed herein, the virtual functions 626, 628 may be created under the physical functions 618, 620, which may be associated with the ports 622, 624. The virtual functions 626, 628 may thus share the physical facilities of the ports 622, 624. The virtual functions 626, 628 may have a limited ability to perform I/O transactions through the ports 622, 624 and may affect the physical state of the port 622, 624. The virtual functions 626, 628 may reconfigure the number and capabilities of individual physical function 618, 620 within the SR-IOV adapter 606.

Each of the virtual functions 626, 628 may be assigned to a different logical partition to enable the logical partitions 602 to access and I/O transaction resources of the SR-IOV adapter 606 and the ports 622, 624.

The configuration firmware 612 may determine the PCI hierarchy containing the SR-IOV adapter 606. Prior to that determination, the virtualization intermediary 608 may detect and configure the SR-IOV adapter to establish a virtual function 626, 628 for each of the physical ports 622, 624. For an illustrative SR-IOV adapter 606, the virtualization intermediary 608 may configure virtual functions 626, 628 to be in a one-to-one correspondence with each physical port 618, 620.

The SR-IOV adapter 606 may support different peripheral device protocols to concurrently access a physical port 618, 620. For example, the SR-IOV adapter 606 may be a converged network adapters configured to enable Ethernet and Fibre-Channel-Over-Ethernet (FCoE) protocols to simultaneously operate over a single physical port 618, 620.

The virtualization intermediary 608 may create a unique instance of a virtual function 626, 628 for each protocol and on each physical port 618, 620 configured to operate multiple protocols. For example, for an illustrative SR-IOV adapter having four physical ports and enabling two protocols (e.g., Ethernet and FCoE), the virtualization intermediary 608 may configure two virtual functions on each physical port, for a total of eight virtual functions.

The virtualization intermediary 608 may provide the configuration firmware 612 with information to construct the PCI device tree 634 having the virtual PCI host bridge nodes 648, 666. The virtual PCI host bridge node 648 may correspond to the virtual function 628 of the SR-IOV adapter 606 assigned to the logical partition 602. Each virtual PCI host bridge node 648, 666 may be similar to the PCI host bridge node 418 of the device tree 416 in FIG. 3. Each virtual PCI host bridge node 648, 666 may be representative of the combined PCI bus and DLPAR domain properties of the PCI host bridge 614, the SR-IOV adapter 606, and the physical function 618, indicated as the virtual PCI host bridge domain 630.

The PCI bus properties 654 may be used by the virtualization intermediary 608 to address the virtual PCI host bridge domain 632. For instance, the virtualization intermediary 608 may translate PCI bus operations targeting the virtual PCI host bridge node 648. As such, the presence of the physical function 620 may be transparent to the operating system 610, as well as to the configuration firmware 612 of the logical partition 602.

The configuration firmware 612 may perform PCI hierarchy detection using PCI configuration read operations across the PCIe link 616. The configuration firmware 612 may thus detect the presence of a PCI function at various possible device addresses. For example, a function may be detected at function numbers 0 through 7, or alternatively at ARI function numbers 0 through 255 of an implied ARI device number.

The virtualization intermediary 608 may intercept PCI configuration read or write transactions to the PCIe link 616. The virtualization intermediary 608 may respond to a PCI bus configuration read operation such that the configuration firmware 612 first detects the virtual function 626 at an emulated function number 0 of the virtual PCI host bridge bus and device 0. The virtualization intermediary 608 may respond to the configuration firmware reads that are directed to only PCI device 0 and function 0 below the virtual PCI host bridge. The configuration firmware 612 may detect only a single PCI function, at function 0, in the PCI hierarchy below the virtual PCI host bridge. The virtual function 626 may thus be represented to the operating system 610 in a manner analogous to that of a PCI single function legacy adapter, such as the PCI adapter 408 of FIG. 4.

The virtualization intermediary 608 may pass configuration read operations directly to an actual virtual function configuration register within the SR-IOV adapter 606. The logical virtual PCI host bridge bus number and device function number may be translated to the actual PCI configuration bus/device/function number utilized on the physical PCI bus, or PCIe link 616.

In another embodiment, the virtualization intermediary 608 may respond directly to the configuration firmware read operations with an emulated register value. The virtualization intermediary 608 may have derived the emulated register value as part of configuring the SR-IOV adapter 606 in SR-IOV mode. This action may maintain the appearance of the virtual functions 626, 628 as single PCI function. The transparency of the physical functions 618, 620 on the virtual PCI host bridge bus may further be maintained with respect to the configuration firmware 612.

The configuration firmware 612 may also be modified from a legacy PCI function configuration to account for limitations of the PCI SR-IOV Architecture. The limitations may relate to the assignment of memory mapped address spaces associated with the virtual functions 626, 628. The configuration firmware 612 may write to the PCI base address registers of a PCI function to determine the size of the PCI memory space used by that base address register of that function. The configuration firmware 612 may select a location within PCI memory at which to bind the base address register and associated PCI memory space. However, the virtualization intermediary 608 may establish a location of the PCI memory regions to map virtual function PCI memory spaces using base address registers in the physical functions 618, 620.

According to the SR-IOV architecture, the virtual functions 626, 628 may not actually implement the PCI base address registers of a PCI function. As such, the PCI bus properties 654 of the virtual PCI host bridge node 648 may specify that the PCI base address registers are read only and cannot be changed in relation to their PCI memory location. As discussed herein, the PCI base address registers may belong to the device(s) on the PCI bus associated with the virtual PCI host bridge node 648.

In order for the configuration firmware 612 to determine the size of each PCI base address space within the virtual functions 626, 628, the configuration firmware 612 may perform the configuration write of all-ones data to each base address register. The virtualization intermediary 608 may emulate the action by storing temporary all-ones values. Where the configuration firmware 612 reads from the base address register, the virtualization intermediary 608 may return an emulated value of all-one bits. The emulated value may indicate the power of two size of the PCI memory space associated with the virtual function base address register. The virtual functions 626, 628 may then return the actual PCI address associated with that virtual function base address register for subsequent configuration reads from that virtual function base address register.

A legacy PCI function may be connected to a ROM device containing adapter vital product data or boot drivers used with that PCI function or adapter. The PCI function may include a ROMBAR that is subject to location within PCI memory by the configuration firmware 612. The virtualization intermediary 608 and configuration firmware 612 may perform the same sequence regarding the ROM base address register within the virtual function configuration space.

The computing system 600 may provide hot plug support to hot plug add or remove an SRIOV adapter. A hot plug module may be a component of a management console 316 in FIG. 3 or some other service element of the computing system 600, which enables a user to use an application interface within the computing system 600 to select a particular physical adapter slot. The physical adapter slot may include a PCI adapter for powering off or on. The hot plug module may enable the user to remove or add a PCI adapter without disrupting other functions of the computer system 600

A PCIe adapter slot may accommodate an adapter, such as the SR-IOV adapter 606, or a legacy, non-SRIVO PCIE adapter, in the same location connected to the PCIe link 616. The hot plug module selects a physical adapter slot location or a power domain associated with the physical adapter slot that is the object of a hot plug operation. The hot plug module may identify the adapter slot or power domain associated with that slot by a physical location ID, such as a system physical location code. The hot plug module may utilize the physical location ID to communicate with the virtualization intermediary to perform a hot plug operation on the selected slot. The virtualization intermediary 608 may determine that a PCI host bridge 614 is affected by a power off or power on to the hot plug location.

An empty PCI adapter slot may be the object of a hot plug power on operation. Such a hot plug power operation may add a PCIe adapter to a physical PCI host bridge 614. While the adapter shown in FIG. 6 is an SR-IOV adapter, a hot plug operation of another embodiment may include a non-SR-IOV adapter having similar or the same connectivity and location possible. In a particular embodiment, a PCIe adapter may be connected to a PCI host bridge that is associated with a previously empty or powered-off adapter slot. When the computing system hot plug module performs a power-on of the PCIe adapter, the virtualization intermediary may determine whether the adapter is SR-IOV-capable. Where the adapter is a non-SR-IOV type of adapter, the virtualization intermediary may take no further action. The configuration firmware may detect a PCI device tree for the non-SR-IOV adapter with a device driver, as shown in FIG. 4. Where the adapter 606 is SR-IOV capable, the virtualization intermediary 608 may determine that the adapter is to be configured in SR-IOV mode so as to be shareable by multiple operating systems 610.

The virtualization intermediary 608 may configure the adapter for SR-IOV mode and assign virtual functions 628, 626 to individual operating systems 610. The virtualization intermediary 608 may associate a DLPAR ID 652 with virtual function 628 and utilize the DLPAR ID to instruct an operating system 610 to DLPAR add a virtual PCI host bridge 648 to its PCI device tree 634. The virtualization intermediary 608 may associate a DLPAR ID 670 with virtual function 626 and utilize the DLPAR ID to instruct an operating system 610 to DLPAR add a virtual PCI host bridge 666 to its PCI device tree 634. The virtualization intermediary 608 may intercept PCI configuration cycles of the configuration firmware 612 to the PCI bus. The PCI bus may be associated with a virtual PCI host bridge (vPHB) 648 or 666. The configuration firmware 612 may detect a single PCI function at each node 648 and 666 to generate a device node 656 and 674, respectively, for that associated virtual function. The configuration firmware 612 may further create an instance of a virtual function device driver 636, 638 in association with the device node 656.

An embodiment may enable the powering-off an adapter that is configured within a running logical partition 602. The power-off operation may allow repair or replacement of an adapter with an alternative adapter. The new adapter may be a different type than the original adapter.

The hot plug power off operation may identify a power domain containing a PCIE adapter, which may be identified by the physical location of the adapter or another identifier suitably understood by the virtualization intermediary to correlate to the location of a PCIE adapter. Accordingly, the PCIe adapter location may enable the virtualization intermediary 608 to identify all PCI hierarchies and devices within the hot plug domain represented by the physical adapter slot location of the adapter 606.

Prior to performing the physical power off operation, the virtualization intermediary 608 may determine all affected PCI devices by correlating the PCIe adapter location specified in the operation with the DLPAR IDs 652, 670 in all virtual PCI host bridge nodes 648, 666. The operating system(s) 610 may then terminate the operations of the device drivers 636, 638 associated with the virtual PCI host bridges (vPHBs) 648, 666 having DLPAR IDs 652, 670 and the device nodes 656, 674 under each virtual PCI host bridge node 648, 666. Once the device drivers 636, 638 have terminated operations, the virtualization intermediary 608 and hot plug module may continue with the physical power off operation of the hot plug domain associated with that PCIe adapter location.

Where a PCIe adapter slot containing an adapter has been powered off, it may be possible for the system user or a service representative to repair or replace the adapter. The replacement adapter may be a different type of adapter (e.g., replacing a PCIe adapter with an SR-IOV capable adapter or vice versa). In either case, a subsequent power-on of the PCIe adapter slot may result in the virtualization intermediary 608 presenting the operating system 610 with an updated PCI device tree 634. The operating system 610 may use the SR- IOV virtual function device drivers 636, 638, along with virtual PCI host bridge nodes 648, 666 for each of the SR-IOV virtual functions 626, 628 that has been configured by the virtualization intermediary 608.

A PCI adapter slot may be removed from or added to the control of a particular running logical partition 602. A PCI adapter may be removed from a logical partition to transfer that adapter to another logical partition during a dynamic logical partitioning (DLPAR) operation. DLPAR operations may reference a PCIE adapter. For example, the PCIE adapter slot location within the computer system 600 may be referenced using a DLPAR ID 652, 670.

According to an embodiment, a PCIe adapter slot associated with the PCI host bridge 614 may not be assigned initially to the logical partition 602 at the time that the logical partition 602 is booted. Adding the PCIe adapter slot to the logical partition 602 may result in the virtualization intermediary 608 adding a PCI host bridge node to the PCIE device tree 634. Where the adapter is a non-SR-IOV type, the virtualization intermediary 608 may take no further action. The configuration firmware 612 may detect the PCI device tree 634 for the adapter 606, as shown in FIG. 4.

Where the adapter 606 is SR-IOV capable, the virtualization intermediary 608 may determine whether the operating system 610 uses the SR-IOV virtual function device drivers 636, 638 as non-SR-IOV mode device drivers. Where the SR-IOV virtual function device drivers 636, 638 are not used, the virtualization intermediary 608 may take no further action, and the configuration firmware 612 may detect a PCI device tree for that adapter 606, as shown in FIG. 4. Where the SR-IOV virtual function device drivers 636, 638 are alternatively used, the virtualization intermediary 608 may configure the adapter as SR-IOV enabled with a single virtual function 626, 628 for each device protocol utilized on each port 622, 624. The virtualization intermediary 608 may further generate the PCI device tree 634 for the operating system 610, as shown in FIG. 6. As discussed herein, the PCI device tree 634 may include the virtual PCI host bridge nodes 648, 666 for each virtual function 626, 628.

The virtualization intermediary 608 may intercept the PCI configuration cycles of the configuration firmware 612 to the PCI bus associated with the vPHBs 648, 666. The configuration firmware 612 may then detect a single PCI function at each PCI host bridge node 648, 666 to generate a device node 656, 674 for the associated virtual function. The configuration firmware 612 may further create an instance of a virtual function device driver 636, 638 associated with the device node 656, 674.

According to a particular embodiment, an SR-IOV adapter may be plugged below a PCI bridge, such as a PCI bridge of a PCIe switch. The PCIe switch may form a PCIe link below a bridge that is analogous to the PCIe link 616. The virtual PCI host bridge 648, 666 may be presented to the logical partition configuration firmware 612. The PCI bus properties 646, 672 of the virtual PCI host bridge 648, 666 may account for the combined properties of the physical PCI host bridge 614 and the PCIe switch. Illustrative such properties may include PCI bus memory and DMA address ranges, as well as interrupt assignments.

Figure 7:
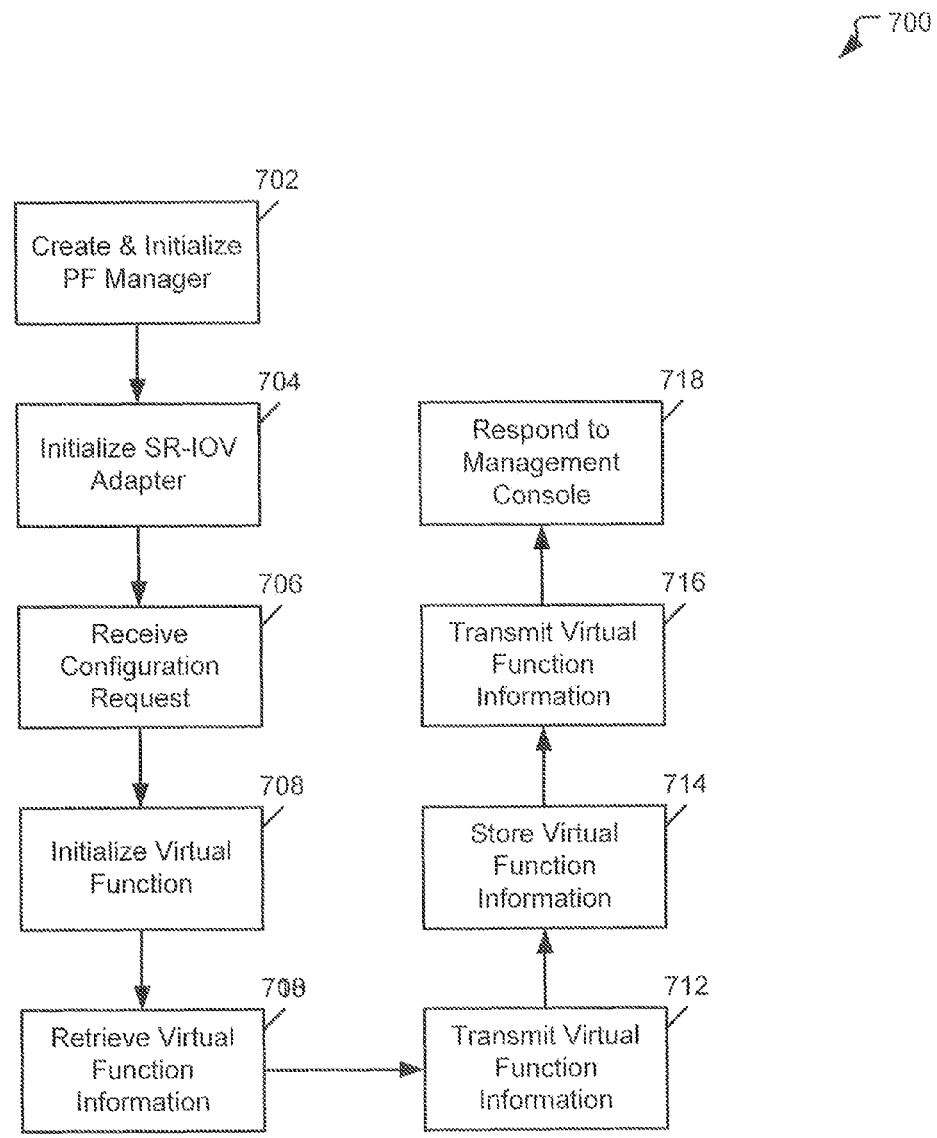
FIG. 7 is a flow diagram of an embodiment of a method of configuring a virtual function of an SR-IOV adapter in a logically partitioned environment.

FIG. 7 is a flowchart of an embodiment of a method 700 of configuring a virtual function of an SR-IOV adapter in a logically partitioned environment. Turning more particularly to the flowchart, the virtualization intermediary may create at 702 a physical function manager (e.g., a PCIM) for the SR-IOV adapter. The virtualization intermediary may further initialize the physical function manager at 702. The physical function manager may initialize the SR-IOV adapter at 704.

At 706, the physical function manager may receive a request to configure a virtual function. The request may be received from a management console via the virtualization intermediary.

The physical function manager may initialize at 708 the virtual function with parameter provided by a system administrative agent. The physical function manager may determine at 710 identification and I/O resource information for the virtual function. Illustrative virtual function information may include: an owning partition ID, a routing ID (e.g., a PCI configuration space address), allocated system interrupt sources, PCI MMIO BAR addresses and sizes, and PCI DMA addresses and sizes, as well as vendor and device IDs. At 712, the physical function manager may transmit the virtual function information to the virtualization intermediary.

The virtualization intermediary may store at 714 the virtual function information for later use in making the virtual function appear as a standard function. For example, the virtual function information may be used during an operating system boot.

The physical function manager may transmit the virtual function information to the virtualization intermediary at 716. At 718, the physical function manager may respond to the management console via the virtualization intermediary.

Figure 8:
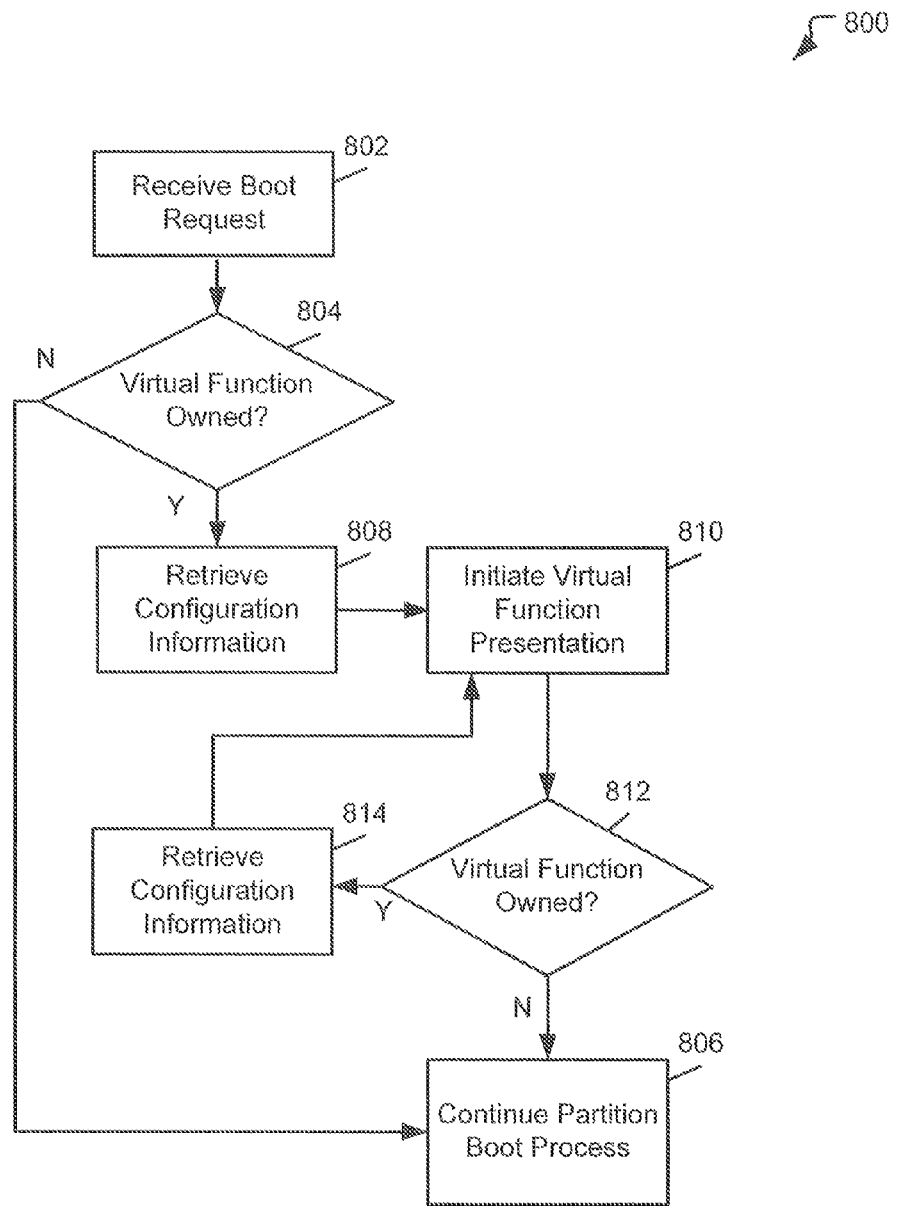
FIG. 8 is a flow diagram of an embodiment of a method of using a virtualization intermediary to boot a logical partition in a logically partitioned environment.

FIG. 8 is a flowchart of an embodiment of a method 800 of using a virtualization intermediary to boot a logical partition. At 802, the virtualization intermediary may receive a request from the management console to boot a logical partition. The virtualization intermediary may determine at 804 whether the logical partition owns a virtual function. Where the logical partition does not own a virtual function, the virtualization intermediary may continue the process of booting the logical partition at 806. Where the logical partition alternatively does own a virtual function at 804, the virtualization intermediary may locate virtual function configuration information at 808 from the physical function manager for the first virtual function owned by a logical partition. The virtualization intermediary may use the virtual function configuration information at 810 to initiate a virtual function configuration process similar to that described in connection with FIG. 9, which follows.

At 812, the virtualization intermediary may determine whether there is another virtual function owned by the logical partition. Where no other virtual function is owned by the logical partition, the virtualization intermediary may continue the process of booting the logical partition at 806. Where there are alternatively other virtual functions owned by the logical partition, the virtualization intermediary may at 814 locate virtual function configuration information that regards the physical function manager for the next virtual function owned by the logical partition. The virtualization intermediary may at 810 then initiate a virtual function configuration processes similar to those described with regard to FIG. 9.

Figure 9:
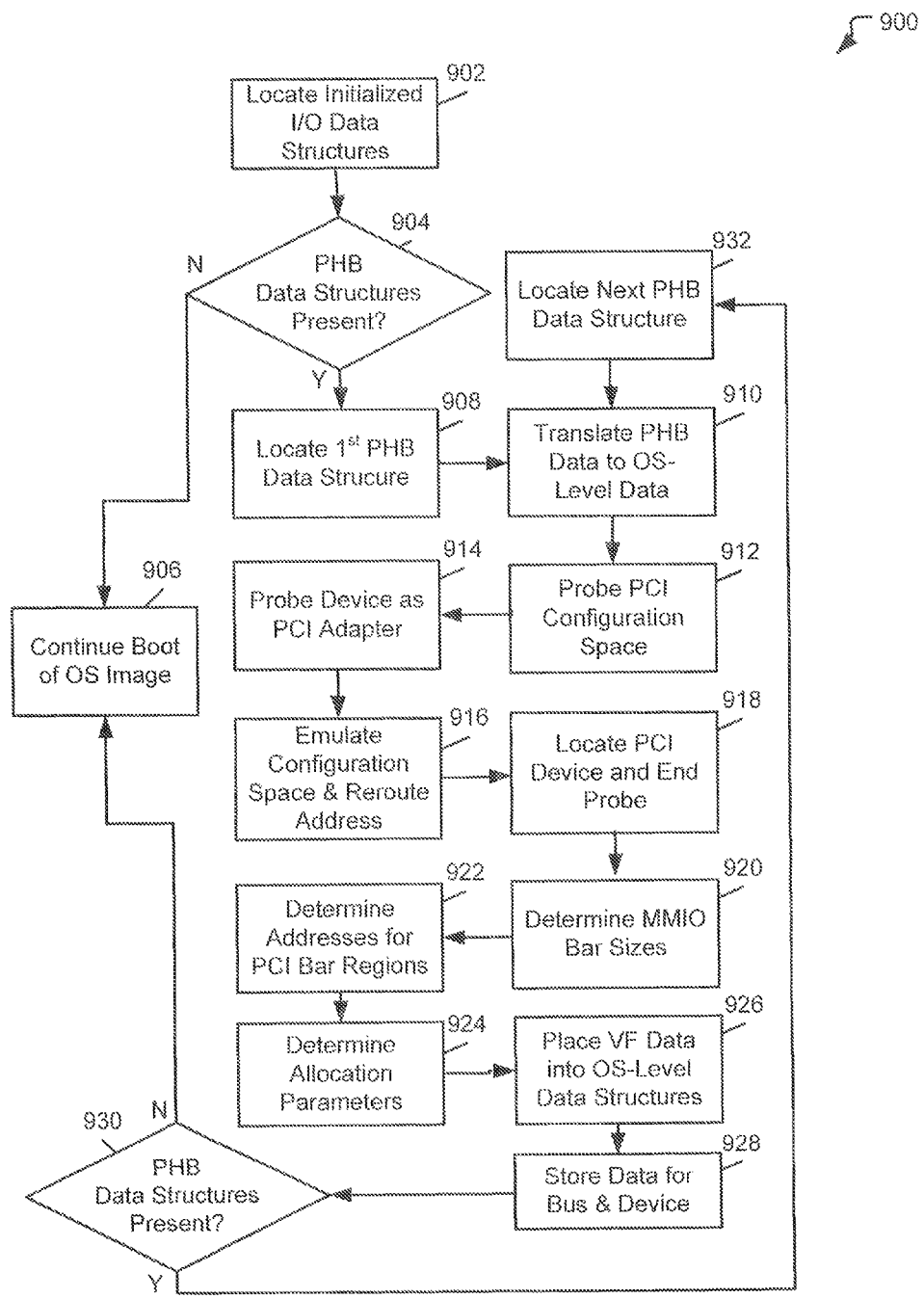
FIG. 9 is a flow diagram of an embodiment of a method of using partition configuration firmware to boot a logical partition in a logically partitioned environment.

FIG. 9 is a flowchart of an embodiment of a method 900 of using partition configuration firmware to boot a logical partition. Turning more particularly to the flowchart, the configuration firmware may initiate execution at 902. The configuration firmware may additionally locate I/O data structures that have been initialized by the virtualization intermediary prior to a booting operation. The configuration firmware may determine at 904 whether there are any PCI host bridge data structures present. Where no PCI host bridge data structures present, the configuration firmware may continue to boot an operating system image at 906. Where there are alternatively PCI host bridge data structures present at 904, the configuration firmware may locate at 908 a first PCI host bridge data structure. The configuration firmware may translate at 910 the PCI host bridge data structure into an operating system-level data structure to represent the PCI bus.

At 912, the configuration firmware may probe the PCI configuration space of device 0 function 0 on the primary bus number. The primary bus number may be indicated by the PCI host bus structure.

The configuration firmware may probe at 914 the device normally as a PCI adapter. The virtualization intermediary may emulate at 916 the configuration space bus/device/function addresses and/or data. The virtualization intermediary may reroute configuration accesses to the physical configuration space address of a virtual function.

The configuration firmware may locate or otherwise determine at 918 a single function PCI device. The determination process may have been a result of the probe. The configuration firmware may discontinue the probe at 918.

At 920, the configuration firmware may determine PCI MMIO BAR sizes. For example, the configuration firmware may use a PCI host bus child data virtual function data structure for the device found during the probe to determine the PCI MMIO BAR sizes. The configuration firmware may determine at 922 the addresses of the PCI BAR regions. The determination may include reading PCI BAR registers or using virtual function data structures.

At 924, the configuration firmware may use a PCI host bus child data virtual function data structure for the device found during the probe to determine other I/O resource allocation parameters as any other PCI device. The configuration firmware at 926 may place data for the virtual function into operating system-level data structures that describe a single function device. Illustrative information in the operating system-level data structures for a single function (e.g., a PCI physical device or a virtual function) may include PCI configuration space addresses, such as routing IDs. Other examples of the information may include DMA window addresses and sizes, PCI IDs, MMIO BAR region addresses and sizes, MSI interrupt assignment information, and vender (VPD) information. The configuration firmware may store at 928 the data for the bus and the device to appropriate locations for the operating system.

The configuration firmware may determine at 930 whether they are additional PCI host bridge data structures present. Where there are not any more PCI host bridge data structures present at 930, the configuration firmware may continue to boot an operating system image at 906. Where there are alternatively more PCI host bridge data structures present at 930, the configuration firmware may locate at 932 a next PCI host bridge data structure. At 910, the configuration firmware may translate the PCI host bridge data structure into an operating system-level data structure to represent the PCI bus.

Figure 10:
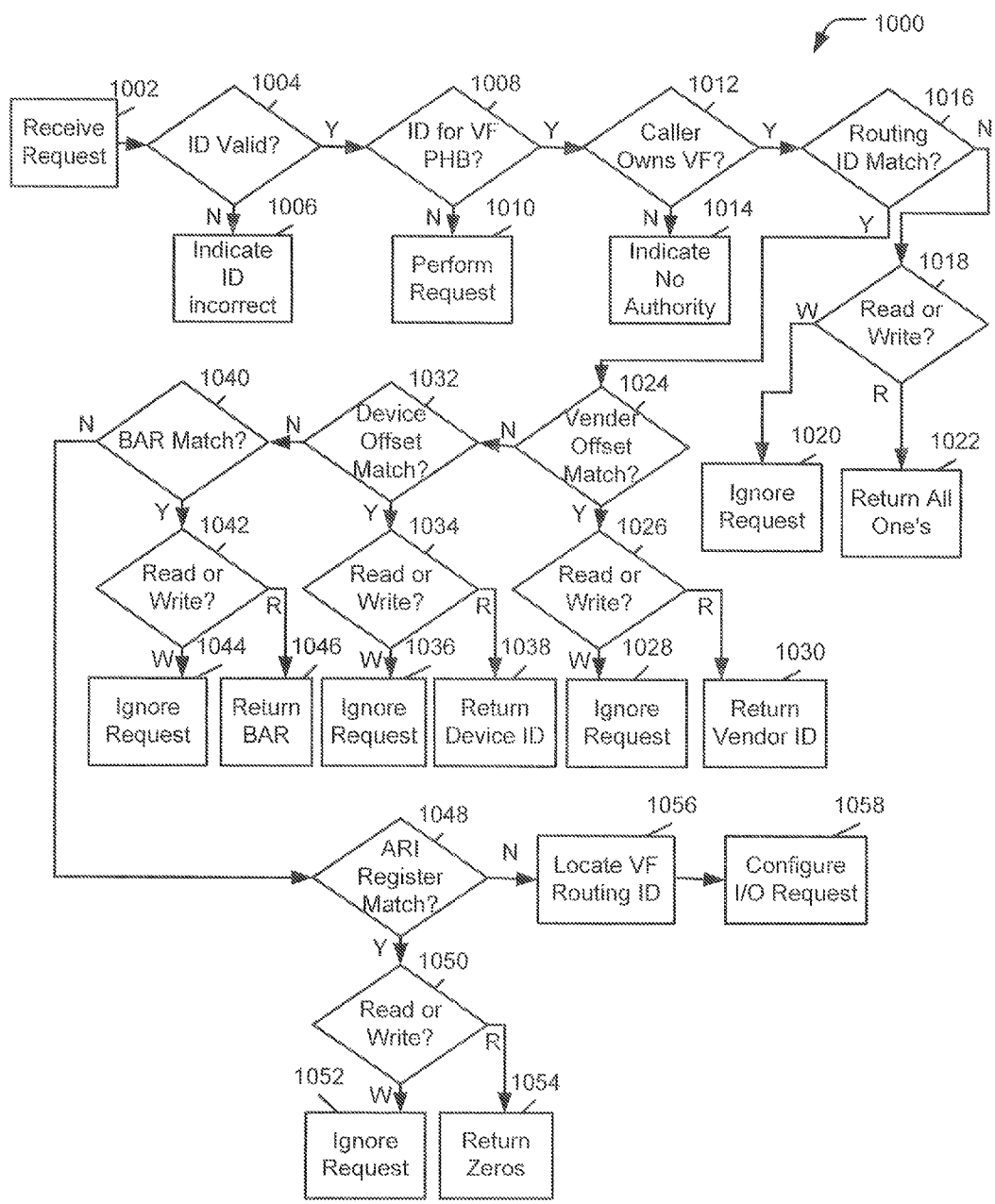
FIG. 10 is a flow diagram of an embodiment of a method of emulating a virtual function configuration space in a logically partitioned environment.

FIG. 10 is a flowchart of an embodiment of a method 1,000 of emulating a virtual function configuration space in a logically partitioned environment. Turning more particularly to the flowchart, the virtualization intermediary may receive at 1,002 a configuration read or write request from a logical partition. The request may include a PCI host bridge unique ID, a routing ID representative of a PCI configuration address bus, device, and function number, and a register offset. The routing ID may be an emulated bus, device, and function number translated by the virtualization intermediary to the actual bus, device, function number of a virtual function, or may be that actual virtual function bus, device, function number. At 1,004, the virtualization intermediary may determine whether the PCI host bridge unique ID is valid. Where the PCI host bridge unique ID is determined to be invalid at 1,004, the virtualization intermediary may generate a signal at 1,006 indicating that the PCI host bridge unique ID is incorrect.

Where the PCI host bridge unique ID is alternatively determined to be valid at 1,004, the virtualization intermediary may at 1,008 determine whether the PCI host bridge unique ID is for a virtual function virtual PCI host bridge. Where the PCI host bridge unique ID is not for a virtual function virtual PCI host bridge at 1,008, the virtualization intermediary at 1,010 may use existing physical PCI host bus configuration mechanisms to perform the requested configuration read or write request.

Where the PCI host bridge unique ID is alternatively determined to be for a virtual function virtual PCI host bridge at 1,008, the virtualization intermediary may determine at 1,012 whether the caller owns the virtual function. Where the caller does not own the virtual function, the virtualization intermediary may generate at 1,014 a return signal to the caller indicating that the caller does not have the authority to access the device. Where the caller alternatively owns the virtual function at 1,012, the virtualization intermediary may determine at 1,016 whether the routing ID matches the predetermined bus, device, and function number representative of the virtual function.

Where the routing ID does not match the predetermined bus number, device, and function number at 1,016, the virtualization intermediary may determine at 1,018 whether the request is a read or a write request. Where the request is a write request, the virtualization intermediary may at 1,020 ignore the request and may transmit a successful return code to the caller. Where the request is alternatively a read request, the virtualization intermediary may at 1,022 return all ones (e.g., a standard operating procedure for returning data targeting an invalid PCI device configuration address), in addition to transmitting the successful return code to the caller.

Where the routing ID does match the predetermined bus, device, function number at 1,016, the virtualization intermediary may determine at 1,024 whether the register offset matches the vendor ID register offset. Where the register offset matches the vendor ID register offset at 1,024, the virtualization intermediary may determine at 1,026 whether the request is a read or a write request. Where the request is a write request, the virtualization intermediary may at 1,028 ignore the request and may transmit a successful return code to the caller. Where the request is alternatively a read request, the virtualization intermediary may at 1,030 return the saved vendor ID value from the virtual function configuration, in addition to transmitting the successful return code to the caller.

Where the register offset does not match the vendor ID register offset at 1,024, the virtualization intermediary may determine at 1,032 whether the register offset matches the device ID register offset. Where the register offset does match the device ID register offset at 1,032, the virtualization intermediary may determine at 1,034 whether the request is a read or a write request. Where the request is a write request, the virtualization intermediary may at 1,036 ignore the request to a read-only register and may transmit a successful return code to the caller. Where the request is alternatively a read request, the virtualization intermediary may at 1,030 return the saved device ID value from the virtual function configuration, in addition to transmitting the successful return code to the caller.

Where the register offset does not match the device ID register offset at 1,032, the virtualization intermediary may determine at 1,040 whether the register offset matches one of the PCI BARs. Where the register offset does match one of the PCI BARs, the virtualization intermediary may determine at 1,042 whether the request is a read or a write request. Where the request is a write request, the virtualization intermediary may at 1,044 ignore the request to a read-only register and may transmit a successful return code to the caller. Where the request is alternatively a read request, the virtualization intermediary may at 1,046 return the saved PCI BAR value (e.g., address) from the virtual function configuration, in addition to transmitting the successful return code to the caller.

Where the register offset does not match one of the PCI BARs at 1,040, the virtualization intermediary may determine at 1,048 whether the adapter supports ARI, and may determine whether the register offset matches the ARI next function register. Where the adapter supports ARI, and the register offset matches the ARI next function register at 1,048, the virtualization intermediary may determine at 1,050 whether the request is a read or a write request. Where the request is a write request, the virtualization intermediary may at 1,052 ignore the request to a read-only register and may transmit a successful return code to the caller. Where the request is alternatively a read request, the virtualization intermediary may return all zeros.

Where the adapter does not support ARI, or the register offset does not match the ARI next function register at 1,048, the virtualization intermediary at 1,056 may retrieve from the virtual function configuration the physical routing ID. At 1,058, the virtualization intermediary may use the physical routing ID to carry out the physical configuration I/O request using existing mechanisms of the virtual function's adapter's parent PCI host bridge.

Figure 11:
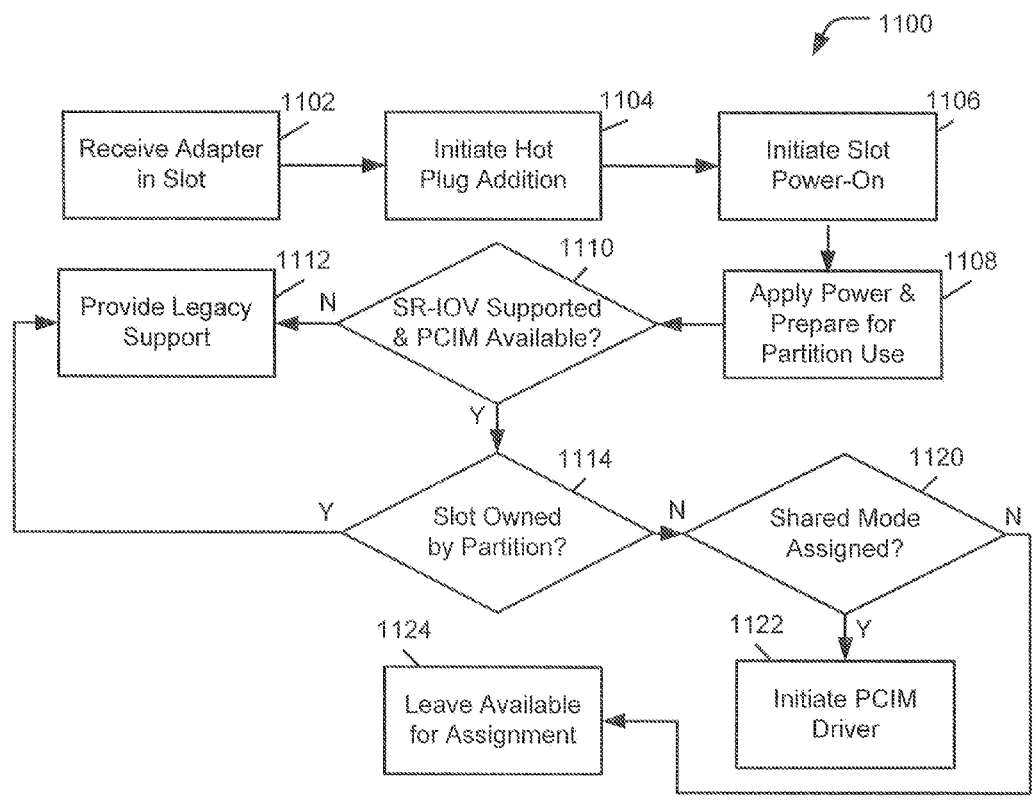
FIG. 11 is a flow diagram of an embodiment of a method of performing a hot plug power-on operation in a logically partitioned environment.

FIG. 11 is a flowchart of an embodiment of a method 1,100 of performing a hot plug power-on operation. At 1,102, an SR-IOV capable adapter may be received in an SR-IOV capable adapter slot. A hot plug addition of the adapter (e.g., a slot power-on) may be initiated at 1,104 via a system management console. The virtualization intermediary may initiate at 1,106 a physical power-on of the adapter slot. The power-on may be initiated by a request from the system management console.

At 1,108 the virtualization intermediary may perform hardware operations to apply power to the adapter. The virtualization intermediary may additionally prepare the bridge, adapter slot, and/or adapter to be used by the logical partition.

The virtualization intermediary may read at 1,110 identification information (e.g., a PCI configuration ID) from that adapter to determine whether the adapter is SR-IOV capable and whether the adapter has a compatible physical function manager (e.g., PCIM) driver. Where the adapter is either not SR-IOV capable or does not have a compatible physical function manager driver, the system may provide legacy support at 1,112. Where the adapter is alternatively SR-IOV capable and has a compatible physical function manager driver at 1,112, the virtualization intermediary may determine at 1,114 whether the adapter is owned by a logical partition.

Where the adapter slot is determined to be owned by a logical partition at 1,114, the virtualization intermediary may provide legacy support at 1,112.

Where the adapter slot is alternatively determined not to be owned by a logical partition at 1,114, the virtualization intermediary may determine at 1,120 whether the adapter is assigned to the virtualization intermediary for SR-IOV shared mode configuration. Where the adapter is not assigned to the virtualization intermediary for SR-IOV shared mode configuration at 1,120, the adapter may be left available at 1,124 for further assignment to the virtualization intermediary, an operating system, or a partition. Where the adapter is alternatively assigned to the virtualization intermediary for SR-IOV shared mode configuration at 1,120, the virtualization intermediary may at 1,122 instantiate the physical function driver. The virtualization intermediary may further initiate the physical function driver, as described in the flowchart of FIG. 7.

Figure 12:
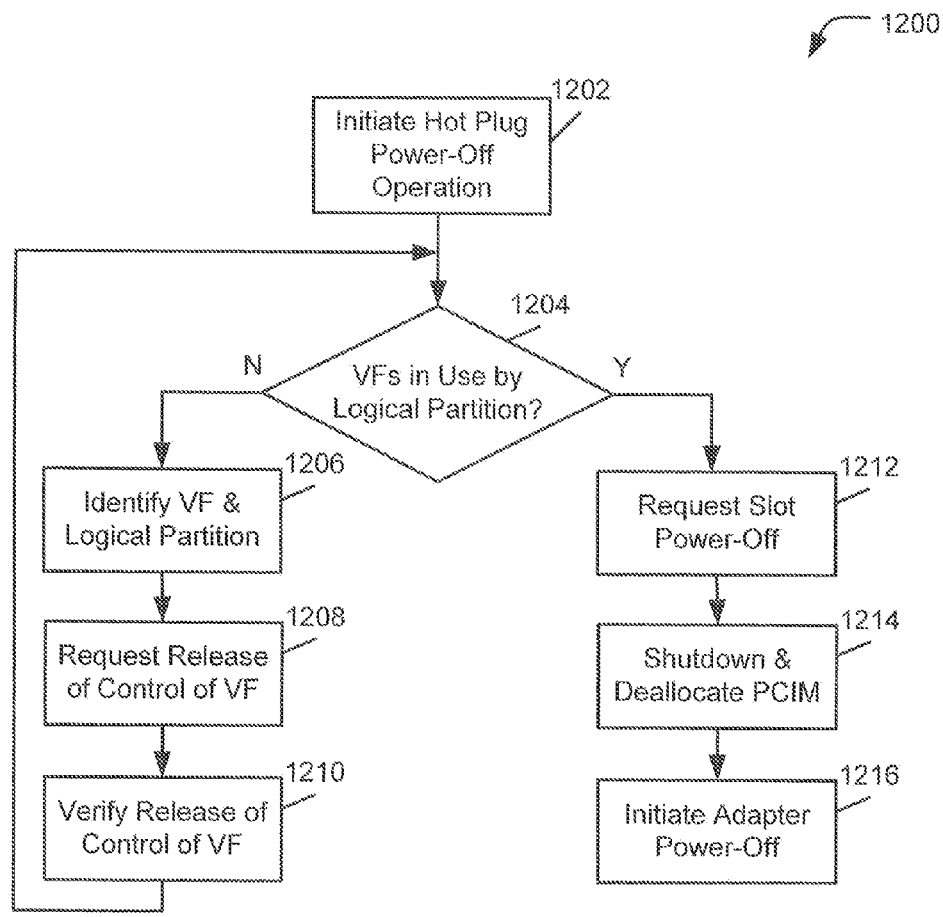
FIG. 12 is a flow diagram of an embodiment of a method of performing a hot plug power-off operation in a logically partitioned environment.

FIG. 12 is a flowchart of an embodiment of a method 1,200 of performing a hot plug power-off operation. A hot plug power-off operation may be conducted when an adapter or adapter slot is moved, replaced, or otherwise serviced. At 1,202, a hot plug power-off operation for an adapter may be initiated by a user. The adapter may be assigned to a virtualization intermediary in SR-IOV mode.

Whether there are virtual functions in use by a logical partition or operating system may be determined at 1,204. Where the system management console determines at 1,204 that there are virtual functions in use by a logical partition or operating system, the remaining in-use virtual functions may be identified at 1,206, along with the operating system and/or logical partition that owns the virtual functions.

The system management console may send at 1,208 a request to the logical partition or operating system to release control of a virtual function. The system management console may then wait for the virtualization intermediary at 1,210 to confirm the logical partition and operating system have released control of the virtual function.

Where the system management console alternatively determines at 1,204 that there are no virtual functions in use by a logical partition or operating system, the system management console may request at 1,212 that the virtualization intermediary power-off the adapter slot. In response, the virtualization intermediary may shutdown and may deallocate the physical function manager (PCIM) at 1,214. The virtualization intermediary may initiate hardware sequences at 1,216 to power-off the adapter so that it may be removed or replaced.

Figure 13:
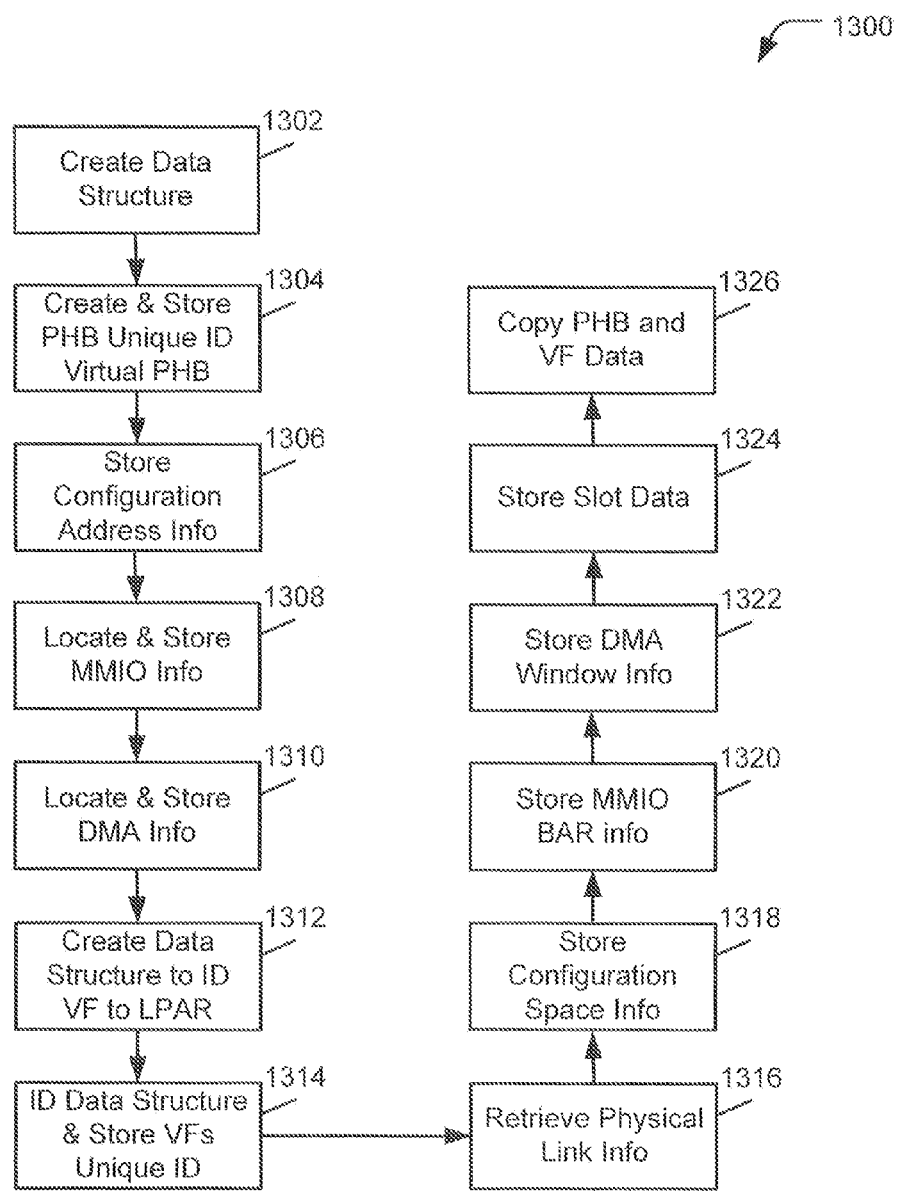
FIG. 13 is a flow diagram of an embodiment of a method executed by a virtualization intermediary to present a virtual function to a logical partition in a logically partitioned environment.

FIG. 13 is a flowchart of an embodiment of a method 1,300 executed by a virtualization intermediary to present a virtual function to a logical partition. Turning more particularly to the flowchart, the virtualization intermediary may create a data structure at 1,302 to identify a physical PCI host bridge to the logical partition.

The virtualization intermediary may create and store a PCI host bridge unique ID at 1,304. The PCI host bridge unique ID may map directly to the unique ID of the virtual function in the PCI host bridge data structure PCI host bridge ID fields. At 1,306, the virtualization intermediary may store configuration space address information with a predetermined primary bus number. The information may be stored in the PCI host bridge data structure PCI configuration space fields. The virtualization intermediary may locate the virtual function's adapter's parent physical PCI host bridge MMIO extents. The virtualization intermediary may store the information in the virtual function's PCI host bridge data structure MMIO range fields.

At 1,310, the virtualization intermediary may locate the virtual function's PCI DMA window information. The virtualization intermediary may store the information in the virtual function's PCI host bridge data structure DMA range fields.

The virtualization intermediary may create at 1,312 a data structure to identify a virtual function to the logical partition. The virtualization intermediary may identify the virtual function data structure at 1,314 as the child to the PCI host bridge data structure and may store the virtual function's unique ID to the virtual function data structure. The virtualization intermediary may use at 1,316 the physical link information from the virtual function's adapter's parent physical PCI host bridge for the virtual function's PCI host bridge data structure physical link information fields. The virtualization intermediary at 1,318 may store the PCI configuration space information to the virtual function data structure, including a bus number range that includes the predetermined bus number, device zero, and function zero.

At 1,320, the virtualization intermediary may store the virtual function PCI MMIO BAR information to the virtual function data structure MMIO range fields. The virtualization intermediary may store at 1,322 the virtual function PCI DMA window information to the virtual function data structure DMA range fields. The virtualization intermediary may locate at 1,324 the virtual function's parent adapter's slot physical, mechanical, and location data and may store the information to the virtual function data structure. At 1,326, the virtualization intermediary may copy the PCI host bridge and virtual function data structures to logical partition memory.

Figure 14:
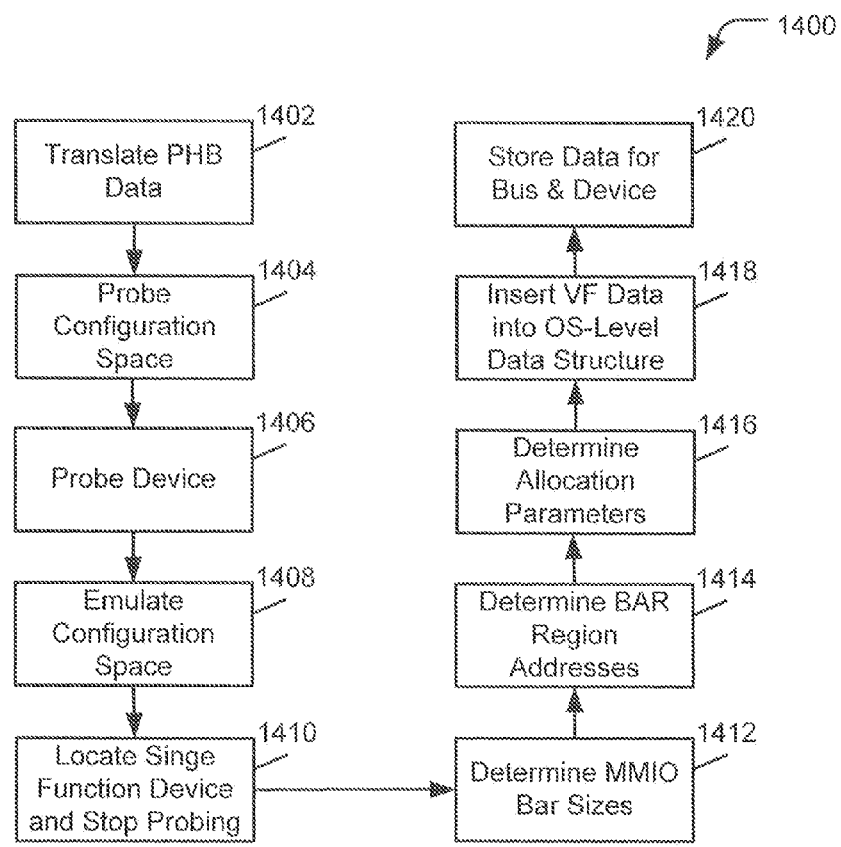
FIG. 14 is a flow diagram of an embodiment of a method of presenting a virtual function from a logical partition to an operating system in a logically partitioned environment.

FIG. 14 is a flowchart of an embodiment of a method 1,400 of presenting a virtual function from a logical partition to an operating system. Turning more particularly to the flowchart, the configuration firmware may translate at 1,402 a PCI host bus data structure into an operating system-level data structure. The operating system-level data structure may represent the PCI bus. The configuration firmware may probe at 1,404 the PCI configuration space of device 0/function 0 on a primary bus number indicated by the PCI host bus data structure.

At 1,406, the logical partition (e.g., configuration firmware within a logical partition) may probe the device as a physical PCI adapter. The virtualization intermediary may emulate at 1,408 the configuration space, as described in the flowchart of FIG. 10. The logical partition may locate a single PCI device as a result of the probe and may discontinue probing at 1,410.

At 1,412, the logical partition may use the PCI host bridge child virtual function data structure for the device that was found during the probe to determine PCI MMIO BAR sizes. The logical partition may read at 1,414 the PCI BAR registers or us the virtual function data structure to determine address for the PCI BAR regions. The logical partition may use the PCI host bridge child virtual function data structure at 1,416 to determine other I/O resource allocation parameters as any other PCI device.

The logical partition may at 1,418 insert data the virtual function into an operating system-level data structure(s) that describes a single function device. Information in the operating system-level data structure(s) for a single function (e.g., PCI physical device or virtual function) may include: a PCI configuration space address (e.g., a routing ID), PCI IDs, DMA window addresses and sizes, MMIO BAR region addresses and sizes, MSI interrupt assignments, and vendor product data. At 1,420, the logical partition may store data for the bus and the device to an appropriate location(s) for the operating system.

A particular embodiment may include a virtualization intermediary of a logically partitioned computer system that configures an SRIOV adapter as SRIOV-enabled such that the adapter is shareable by multiple operating systems and/or logical partitions and such that a particular operating system and/or logical partition is assigned direct control over one or more individual virtual functions of the adapter. The virtualization intermediary may represent a PCI hierarchy above an individual virtual function as a virtual PCI host bridge, or root port, and may represent the virtual function, itself, as a PCI single function endpoint device directly connected to the virtual PCI host bridge/root port. The virtualization intermediary may virtualize the requester ID of a virtual function as device 0 function 0 on bus 1, or any other emulated PCI bus number, below the virtual root port or PCI host bridge, the virtualization intermediary or firmware may emulate virtualization intermediary BAR registers as read only 0-5 in the base PCI configuration space of the virtual function having the values the virtualization/firmware determined by setting the virtual function's parent physical function SR-IOV capability virtual function ROMBARs, and the virtualization/virtual function may emulate a ROMBAR mapped read only by a virtual function to enable extraction of adapter vendor data and a (UEFI or FCODE) virtual function boot driver, and other such things the virtualization/firmware may necessarily emulate to operate the virtual function within a logical partition operating system as a single function device endpoint of a PCI device.

The system administration services of a logically partitioned computer may add a virtual function to or may remove a virtual function from a logical partition. The virtualization intermediary may represent the PCI hierarchy containing the virtual PCI host bridge/root port and virtual function to system administration and operating system logical partition add or remove interfaces in the same way as the virtualization intermediary represents PCI hierarchies including PCI host bridge/root ports connected to whole physical adapters. The assignment to a logical partition of a PCI hierarchy including a virtual PCI host bridge/root port and virtual function may result in configuring that hierarchy within the operating system of the logical partition in the same way as configuration of a PCI hierarchy including a physical PCI host bridge/root port connected to PCIe single function endpoint device.

Removing the PCI hierarchy including the virtual function from a logical partition may result in the operating system deactivating the virtual function device driver and de-configuring the PCI hierarchy including the virtual PCI host bridge/root port and virtual function. The PCI adapter slot including the SR-IOV adapter may be an object of a system administrator or service hot plug operation.

A system administrative hot plug power-on of an SRIOV adapter in a PCI adapter slot may result in a system virtualization intermediary automatically determining that the adapter is SRIOV-capable and configuring the adapter as SRIOV-enabled, including activating a virtualization intermediary agent for that adapter and allocated associated virtualization intermediary storage to perform the SR-IOV configuration.

According to a particular embodiment, the PCIe adapter slot including an SR-IOV adapter may have been empty prior to the power-on of the adapter slot now containing the SR-IOV adapter. In another embodiment, the PCIe adapter slot including an SRIOV adapter may have included an adapter that was not SRIOV and that had been previously hot plug powered-off prior to the power-on of the adapter slot now including the SR-IOV adapter. The PCIe adapter slot including an SR-IOV adapter may have included an SRIOV adapter of another type and may have been previously hot plug powered-off prior to the power-on of the adapter slot now including the SR-IOV adapter. The PCIe adapter slot including an SRIOV adapter may have included an SR-IOV adapter of the same type, or the identical same SR-IOV adapter, and may have been previously hot plug powered-off prior to the power-on of the adapter slot now including the SR-IOV adapter.

A system administrative hot plug power-off of a PCIe adapter slot including an SRIOV-enabled adapter may result in the virtualization intermediary signaling all operating system instances/logical partitions having ownership of a virtual function on the adapter to remove the PCI hierarchy that includes the virtual function from the operating system configuration, detecting that all virtual functions have been released from operating system operations and control, and then powering-off the SR-IOV adapter, including deactivating the virtualization intermediary agent and associated virtualization intermediary storage that performed the SR-IOV configuration and adapter management.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Use of the terms Peripheral Component Interconnect Express (PCIe) and Peripheral Component Interconnect (PCI) may be used interchangeably in some instances. Moreover, the terms operating system and logical partition, or logical partition and configuration firmware, may be used interchangeably in certain of the embodiments described herein. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of managing an adapter, the method comprising:
   configuring a hardware input/output (I/O) adapter using a virtualization intermediary in a single root input/output virtualization (SR-IOV) enabled mode;
   enabling the hardware I/O adapter to be shared by a plurality of operating systems, wherein the hardware I/O adapter hosts a first virtual function and a second virtual function, and wherein the first and second virtual functions are associated with respective first and second virtual function identifiers (IDs);
   assigning, by the virtualization intermediary, the first and second virtual functions to at least one operating system of the plurality of operating systems, wherein the at least one operating system includes a peripheral component interconnect (PCI) device tree; and
   assigning, by the virtualization intermediary, respective first and second tokens to the at least one operating system, wherein the first token includes the first virtual function ID and a group identifier associated with a slot location of the hardware I/O adapter hosting the first virtual function, and wherein the second token includes the second virtual function ID and the group identifier associated with the slot location of the hardware I/O adapter.

2. The method of claim 1, further comprising presenting the first virtual function as a non-SR-IOV function; and in response to a move of the hardware I/O adapter from the slot location to a second slot location, associating, by the virtualization intermediary, the group identifier with the second slot location.

3. The method of claim 1, further comprising presenting the first virtual function as one of a PCI function and a SR-IOV function.

4. The method of claim 1, further comprising correlating a SR-IOV function to the at least one operating system as a non-SR-IOV function.

5. The method of claim 1, wherein the hardware I/O adapter is coupled to a PCI host bridge.

6. The method of claim 1, further comprising generating at least one virtual function for each protocol of a plurality of protocols associated with each port of a plurality of ports of the hardware I/O adapter.

7. The method of claim 1, further comprising modifying an operational status of the hardware I/O adapter based on at least one virtual function and the at least one operating system.

8. The method of claim 1, further comprising correlating, by the virtualization intermediary, the first virtual function to a non-SR-IOV function.

9. The method of claim 1, further comprising removing, by the virtualization intermediary, the first virtual function.

10. The method of claim 1, further comprising adding, by the virtualization intermediary, the first virtual function to a configuration space of the hardware I/O adapter.

11. The method of claim 1, further comprising determining, by the virtualization intermediary, that the hardware I/O adapter is SR-IOV-capable.

12. The method of claim 11, further comprising activating a virtualization intermediary agent associated with the hardware I/O adapter and allocating virtualization intermediary storage to configure the hardware I/O adapter as SR-IOV-enabled.

13. The method of claim 1, further comprising:

creating a first PCI Host Bridge node in the PCI device tree;

creating a first device node in the PCI device tree upon detection of a first physical function of the hardware I/O adapter, wherein the first device node is associated with the first virtual function and the first PCI Host Bridge node;

creating a second PCI Host Bridge node in the PCI device tree;

creating a second device node in the PCI device tree upon detection of a second physical function of the hardware I/O adapter, wherein the second device node is associated with the second virtual function and the second PCI Host Bridge node;

correlating a hot plug ID associated with a hot plug power-off/on operation with a hot plug ID associated with the first PCI Host Bridge node; and performing, by the at least one operating system, a power-off or power-on operation of the hardware I/O adapter based on the hot plug ID associated with the first PCI Host Bridge node.

14. An apparatus, comprising:

an adapter to position within an adapter slot, wherein the adapter includes a plurality of virtual functions;

a processor; and a memory storing program code, the program code executable by the processor to:

configure the adapter using a virtualization intermediary in a single root input/output virtualization (SR-IOV) enabled mode;

enable the adapter to be shared by a plurality of operating systems, wherein the adapter hosts a first virtual function and a second virtual function, and wherein the first and second virtual functions are associated with respective first and second virtual function identifiers (IDs);

assign the first virtual function and the second virtual function to at least one operating system of the plurality of operating systems, wherein the at least one operating system includes a peripheral component interconnect (PCI) device tree; and assign respective first and second tokens to the at least one operating system, wherein the first token includes the first virtual function ID and a group identifier associated with a location of the adapter slot hosting the first virtual function, and wherein the second token includes the second virtual function ID and the group identifier associated with the location of the adapter slot.

15. The apparatus of claim 14, wherein an operational status of the adapter includes at least one of a power-off operation, a power-on operation, or an assignment of the adapter to the at least one operating system, and wherein each virtual function ID identifies a particular virtual function associated with the adapter.

16. The apparatus of claim 14, wherein the program code is executed to power-on the adapter slot prior to the adapter being positioned within the adapter slot.

17. The apparatus of claim 14, wherein the adapter is a SR-IOV adapter, and wherein the adapter slot previously contained a non-SR-IOV adapter.

18. The apparatus of claim 17, wherein the adapter slot is powered-off with the non-SR-IOV adapter prior to powering-on the adapter slot.

19. The apparatus of claim 14, wherein the adapter is an SR-IOV adapter, wherein the adapter slot previously contained a second SR-IOV adapter, and wherein the adapter slot is powered-off with the second SR-IOV adapter prior to powering-on the adapter slot.

20. A computer program product comprising a computer usable medium having computer usable program code embodied therewith, the computer usable program code executable by a processor to:

enable an adapter to be shared by a plurality of operating systems, wherein the adapter hosts a first virtual function and a second virtual function, and wherein the first and second virtual functions are associated with respective first and second virtual function identifiers (IDs);

assign the first and second virtual functions to at least one operating system of the plurality of operating systems, wherein the at least one operating system includes a peripheral component interconnect (PCI) device tree; and assign respective first and second tokens to the at least one operating system, wherein the first token includes the first virtual function ID and a group identifier associated with a slot location of the adapter hosting the first virtual function, and wherein the second token includes the second virtual function ID and the group identifier associated with the slot location of the adapter.

* * * * *